US012708920B2

(12) United States Patent
Salazar

(10) Patent No.: US 12,708,920 B2
(45) Date of Patent: Aug. 18, 2026

(54) DRY FILTER MODULE FOR USE IN SPRAY BOOTH

(71) Applicant: GIFFIN, INC., Auburn Hills, MI (US)

(72) Inventor: Abraham J. Salazar, Lake Orion, MI (US)

(73) Assignee: GIFFIN, INC., Auburn Hills, MI (US)

( * ) Notice: Subject to any disclaimer, the term of this patent is extended or adjusted under 35 U.S.C. 154(b) by 676 days.

(21) Appl. No.: 18/043,603

(22) PCT Filed: Sep. 7, 2021

(86) PCT No.: PCT/US2021/049234
§ 371 (c)(1),
(2) Date: Mar. 1, 2023

(87) PCT Pub. No.: WO2022/051709
PCT Pub. Date: Mar. 10, 2022

(65) Prior Publication Data

US 2023/0321682 A1 Oct. 12, 2023

Related U.S. Application Data

(60) Provisional application No. 63/074,624, filed on Sep. 4, 2020.

(51) Int. Cl.
*B05B 14/43* (2018.01)
*B05C 15/00* (2006.01)
*B05C 19/00* (2006.01)

(52) U.S. Cl.
CPC .............. *B05B 14/43* (2018.02); *B05C 15/00* (2013.01); *B05C 19/00* (2013.01)

(58) Field of Classification Search
USPC ................................ 118/308, 309, 326, 634
See application file for complete search history.

(56) References Cited

U.S. PATENT DOCUMENTS 4,723,505 A 2/1988 Wilson et al.
2002/0046701 A1* 4/2002 Browning ............ B05B 16/405 118/326

(Continued)

FOREIGN PATENT DOCUMENTS

DE 102018112738 A1 8/2018

OTHER PUBLICATIONS

International Search Report and Written Opinion of PCT/US2021/49234, mailed Dec. 20, 2021.

*Primary Examiner* — Yewebdar T Tadesse
(74) *Attorney, Agent, or Firm* — DICKINSON WRIGHT PLLC

(57) ABSTRACT

A dry filter module adapted for use with a paint spray booth having an under section inlet for conducting a flow of contaminated air and an under section outlet for conducting a flow of filtered air includes at least one movable cart formed with a housing having one or more surfaces for providing a housing inlet and a housing outlet, at least one filter media element arranged within the housing, and at least one seal provided around the one or more surfaces for sealing between the housing inlet and the under section inlet and also between the housing outlet and the under section outlet. The movable cart is operated to move for making contact with the at least one seal between the housing and the spray booth such that the housing of the movable cart and the spray booth are connected and sealed to each other.

23 Claims, 23 Drawing Sheets

(56) References Cited

U.S. PATENT DOCUMENTS

| | | | |
|---|---|---|---|
| 2015/0367372 | A1 | 12/2015 | Roeckle et al. |
| 2018/0207669 | A1 | 7/2018 | Zebisch et al. |
| 2020/0179853 | A1 | 6/2020 | Wieland et al. |

* cited by examiner

DRY FILTER MODULE FOR USE IN SPRAY BOOTH

CROSS-REFERENCE TO RELATED APPLICATIONS

This application is a 35 U.S.C. § 371 national phase of PCT International Application No. PCT/US2021/049234, filed Sep. 7, 2021, which claims the benefit of priority under 35 U.S.C. § 119 to U.S. Provisional Patent Application No. 63/074,624, filed Sep. 4, 2020, the contents of which are incorporated herein by reference in its entirety.

TECHNICAL FIELD

The present disclosure relates to a paint spray booth with a dry-filter module or modules having various filtration arrangements.

BACKGROUND

The statements in this section merely provide background information related to the present disclosure and may not constitute prior art.

Spray booths are used in many industrial applications for applying paint or other coatings to components or assemblies. These systems are used to create an environment for applying high-quality coatings as well as controlling the environmental emissions of solids and volatile organic compounds (VOCs). In some applications, typically those for applying paint to components using a booth which may not be as large as an automobile body paint booth, it is appropriate and convenient to use dry filters as an alternative to water wash filters to capture the oversprayed paint. For example, even within the automotive vehicle production market, spray booths used to paint smaller parts, fascias, mirror covers, etc., are potential candidates to use a dry-filter type. However, the choice of capture technology depends on the amount of overspray generated per unit time, and other factors.

In addition to simplicity and reducing initial investment, dry-filter booths have the advantage over water wash filters in that they do not add moisture to the exhaust air, therefore, in principle, reconditioning the air to allow recirculating it back to the booth may be operationally cheaper. Besides, eliminating water also eliminates the need for a water reconditioning process that takes place in a sludge tank in which paint solids are separated and disposed of. However, since dry filters typically do not remove VOCs flashing from the paint into the air, the concentration of fumes in the exhaust can be typically larger than that in water washed booths. An explanation for this is that both the water and the chemicals added to it absorb some of these VOCs. In addition, in water washing, filtration is constantly transferring paint into water. This water stays only a short period of time in contact with the air. In fact, the majority of the water is collected and removed from the booth shortly after contacting the paint and directed to a treatment process. In the dry-filter booth, the captured paint remains in the filter which continues being exposed to the air and evaporating VOCs, until it almost dries up. Therefore, the total amount of VOCs released to the air per unit mass of paint sprayed is typically larger in a dry-filter booth.

Moreover, since dry-filter booths are typically less sophisticated, their spraying process may not include robots and electrostatic charging. As a result, paint transfer efficiency is typically lower in dry-filter booths when compared to that occurring in a more sophisticated water washed booth. Lower transfer efficiency means more overspray generated per unit mass of paint sprayed. More overspray in turn means more paint to capture and more VOCs released to the air. All these reasons prevent the use of dry-filter booths in certain painting operations, for example those that use a substantial amount of paint per unit time.

Another limitation, and inconvenience, of presently available dry filter spray booths is that, as the filters load with paint, the pressure drop through the filters constantly changes, which affects not only the energy required to operate the booth but also the air distribution inside the spraying section of the booth, potentially affecting the quality of the paint job. Moreover, for a given filter type, design and configuration, a correlation exists between the filter's efficiency and how quickly it will load with paint. When the filters load excessively, it is typically mandatory to stop the painting operation to change the filters regardless of the stage of the painting process which may lead to defects and/or lost parts, therefore changing filters may be a time consuming process that adds no value to the production process, thus, it becomes a waste in productivity.

Numerous designs and systems for dry filter applications are known for use with large-scale industrial applications. For example, carts can be used for transporting dry filters, either new or laden with contaminants. In the design of such systems, it is important to enable convenient changing of filter media elements and disposal of used dry filter elements. In addition, concerns of cost, efficiency and maintenance requirements are present. For some dry filter system designs, time-consuming taping and sheeting of filter systems is necessary to provide proper air sealing and confinement of contaminant laden airflow. Also, taping is necessary to avoid paint from creeping within the space between the filters and between the filter support and the filter. If allowed, this paint may dry during booth operation which would make changing filters very difficult. Further considerations are the clearance and space requirements for implementing a particular dry filter technology. Overspray containment, whether by water wash or dry filter technologies, is generally accomplished using a dedicated volume beneath a spray booth (namely under section). Designs which require greater height under the spray booth add considerably to the initial cost of the entire installation.

SUMMARY

Dry filter concepts in accordance with the present invention are described in numerous embodiments. Common among the embodiments is the use of a transportation cart which moves one or more media elements into position which is sealed into an airflow system to provide filtration. For these concepts, a filter media element is oriented horizontally into the filter cart (vertical downward airflow direction). This orientation provides benefits in terms of filter performance and height of the dedicated space beneath the spray booth for capture. Additionally, it provides an enclosing cart of limited height which enhances its stability during movement. Further, the present invention allows changing the filters quickly and in a contained environment, which reduces exposure to non-authorized and non-properly-protected personnel.

In accordance with an exemplary aspect of the present disclosure, a dry filter module adapted for use with a paint spray booth having an under section inlet for conducting flow of contaminated air and an under section outlet for conducting flow of filtered air includes at least one movable cart formed with a housing having one or more surfaces for providing a housing inlet and a housing outlet, at least filter media element arranged within the housing and positioned between the housing inlet and the housing outlet, and at least one seal provided around the one or more surfaces for sealing between the housing inlet and the under section inlet and between the housing outlet and the under section outlet. The movable cart is operated to move for making contact with the at least one seal between the housing and the spray booth such that the housing of the movable cart and the spray booth are connected and sealed to each other.

In accordance with a further aspect of the present disclosure, the at least one dry filter module includes a collection bin arranged below the at least one filter media element such that the collection bin is configured to receive paint droplets captured by the at least one filter media element.

In accordance with a further aspect of the present disclosure, the housing of the movable cart includes a hollow passage for communicating between the housing inlet and the housing outlet. The housing of the movable cart includes a first chamber having a filter rack to receive the at least one filter media element and a second chamber having the hollow passage adjacent to the filter rack to exhaust airflow filtered from the filter rack of the housing. The filter rack of the housing is formed with at least one level receiving one filter media element such that the filter media element arranged in the at least one level is replaced with different types of the filter media element, respectively. The filter media elements are each formed with a panel type filter or a bag type filter.

In accordance with a further aspect of the present disclosure, the housing includes a top surface selectively connected to the spray booth and formed with the housing inlet for receiving contaminated air from the spray booth and the housing outlet for discharging the filtered air. The top surface of the housing is divided by a wall at a junction providing a separation between the housing inlet and the housing outlet. Due to the housing outlet formed in the top surface of the housing, the filtered air flowing through the housing outlet avoids paint dropping from the filter media elements.

In accordance with a further aspect of the present disclosure, the movable cart is positioned and locked over a lift in an under section below the spray booth in a loaded position. In the loaded position of the movable cart, the lift is operated to raise the movable cart to seal between the housing inlet and the under section inlet and also between the housing outlet and the under section outlet defined as an operating position such that the movable cart and the spray booth are sealed in the operating position.

In accordance with a further aspect of the present disclosure, the housing of the movable cart further includes a third chamber having the at least one filter media element as a second filter rack. The first chamber having the filter rack and the third chamber having the second filter rack are communicated through the hollow passage formed in the second chamber of the housing. The second chamber is arranged below both the filter racks such that the filtered air passing through the first chamber vertically passes through the second filter rack toward an exhaust duct.

In accordance with a further aspect of the present disclosure, the housing of the movable cart further includes a pre-chamber formed with the housing inlet such that the first chamber having the filter rack is arranged between the pre-chamber and the second chamber. The filter rack formed in the first chamber receives the at least one filter media element vertically arranged in the filter rack. The dry filter module further includes a pre-filter arranged in the pre-chamber to collect accumulated paint forming droplets falling into a collection bin.

In accordance with a further aspect of the present disclosure, the dry filter module includes an additional filter house structure arranged adjacent to the housing outlet of the movable cart such that the additional filter house structure is located between the housing outlet and an exhaust duct. The additional filter house structure is fixed on a surface of a sub-section below the spray booth. The additional filter house structure is formed with a separate filter cart positioned over a lift in a sub-section below the spray booth.

In accordance with a further aspect of the present disclosure, each of the under section inlet and outlet formed in the paint spray booth includes a sliding door used to close both the under section inlet and outer respectively such that each of the movable carts is replaced during the operation of the paint spray booth.

In accordance with another aspect of the present disclosure, a dry filter module adapted for use with a paint spray booth having an under section inlet for conducting a flow of contaminated air and an under section outlet for conducting a flow of filtered air includes at least one movable cart formed with a housing having a generally horizontal surface forming a housing inlet, and the movable cart further forming a housing outlet, at least one filter media element arranged within the housing and positioned between the housing inlet and the housing outlet for filtering the contaminated air flowing through the movable cart, at least one seal provided on the generally horizontal surface for sealing between the housing inlet and the under section inlet, and also between the housing outlet and the under section outlet, and the dry filter module operable in two positions, a loaded position wherein the movable cart is arranged in an under section before the sealing and an operating position wherein the dry filter module is in a sealing contact between the movable cart and the spray booth.

In accordance with a further aspect of the present disclosure, the housing includes a top surface selectively connected to the paint spray booth and formed with the housing inlet receiving the contaminated air from the paint spray booth, and a bottom surface selectively connected to an exhaust duct of the spray booth and formed with the housing outlet discharging the filtered air.

In accordance with a further aspect of the present disclosure, the dry filter module further includes a lift operable to move the cart vertically between the loaded position and the operating position. The at least one seal includes an inflatable seal provided between the housing of the movable cart and the spray booth.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1A:
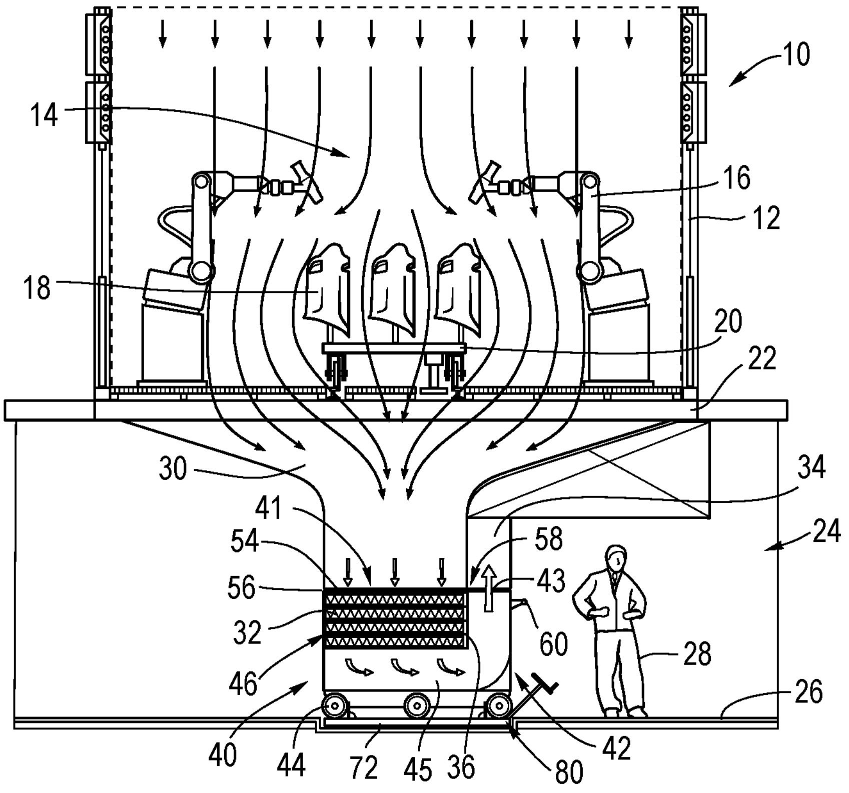
FIG. 1A is a cross-sectional end side view of a filter cart with a spray booth in accordance with an exemplary embodiment of the present disclosure.

The drawings described herein are for illustration purposes only and are not intended to limit the scope of the present disclosure in any way.

DETAILED DESCRIPTION OF THE PRESENTLY PREFERRED EMBODIMENTS

The following description is merely exemplary in nature and is not intended to limit the present disclosure, application, or uses. It should be understood that throughout the drawings, corresponding reference numerals indicate like or corresponding parts and features.

FIG. 1A provides a representative of a spray booth 10 which may be used with the filter arrangements of the present invention. Spray booth 10 is generally presented as background for use with all embodiments described here. Spray booth 10 is shown having an enclosure 12 providing spraying bay 14. Enclosure 12 is shown in this example as having internal spray gun robots 16 for applying paint to articles 18, shown here as example motor vehicle front fascia panels carried by trolley 20. The description provided herein is equally applicable where manual spray paint applications are performed. Airflow through enclosure 12 is designated by arrows in FIG. 1A. Airflow here is presented as a downdraft configuration, but others like side draft and semi-downdraft can also be implemented. As shown in FIG. 1A, the airflow begins traveling from the upper portion of spraying bay 14 and across and around articles 18. The airflow now contaminated with paint overspray travels through floor grate 22 into under section 24 which includes equipment for filtering the paint laden airflow using designs in accordance with the present invention. Under section 24 includes floor 26 or is a pit as shown here providing an accommodation for maintenance personnel 28 for handling the filtration devices (e.g., dry filter module) in accordance with this invention. Paint laden air is directed into hood 30 and passes through filter media elements 32. After passing through the filter media elements, the airflow in this case is directed upwardly into exhaust duct 34. The airflow passing through the filter media elements 32 is directed upwardly into the exhaust duct 34 but others like a downward direction or a side direction can also be implemented. Airflow is driven by a large fan (not shown) located in an exhaust stack coupled with exhaust duct 34. In the following description of preferred embodiments of the present invention the components of spray booth 10 will be referenced including some variations of the system as depicted in FIG. 1A. Elements which are the same as those described previously in this and subsequent embodiments are identified by like reference numbers and a repeated description is not necessary.

Figure 2:
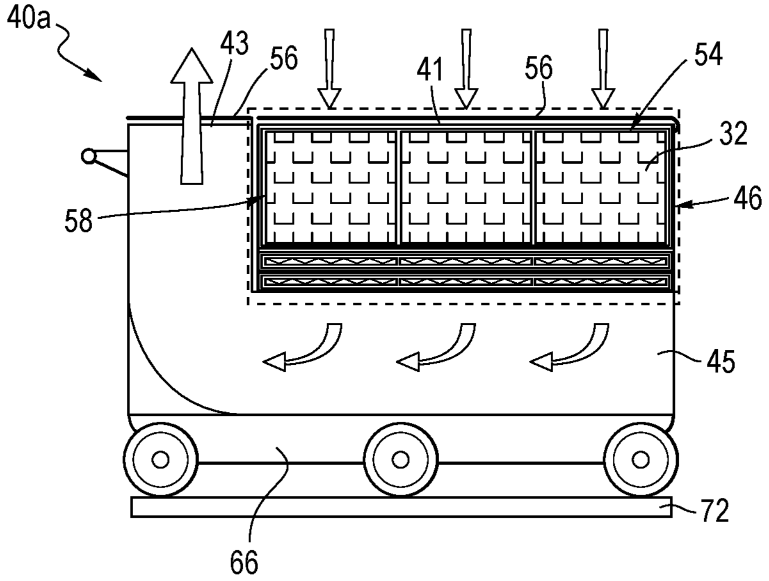
FIG. 2 is a side schematic view of a filter cart in accordance with an exemplary embodiment of the present disclosure.

In FIG. 1A, a first embodiment of a filter cart 40 in accordance with the present invention is described. The filter cart 40 is an enlarged hollow container 42, possibly formed from sheet-metal, hard plastic, or other materials. In the illustration, wheels 44 are shown for enabling cart 40 to be conveniently moved. In this embodiment, filter rack 46 is provided in the cart for supporting filter media elements 32. In this case, for example, filter media elements 32 include same types providing four filtration levels, but in another approach, the filter media elements 32 can include different types, providing three filtration levels (see FIG. 2). In FIG. 2, filter cart 40*a* differs from the filter cart 40 in the type of the filter media elements 32 having the first level 1 providing coarse filtration with progressively finer filtration provided at the levels 2 and 3 such as paper mesh filters, cardboard filters, fiber mat filters, etc.

Figure 1B:
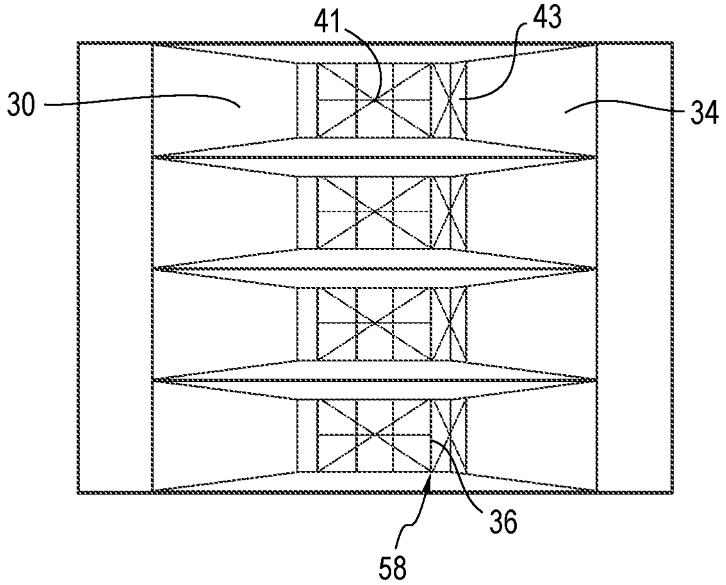
FIG. 1B is a corresponding cross-sectional end top view of FIG. 1A.

Referring back to FIG. 1A, the filter cart 40 is shown having a generally horizontal top (or upper) surface 54 having a perimeter top seal 56. For example, the seal 56 can be an adhesive material or an inflatable seal type. The filter cart 40 as a movable container is generally divided into two chambers; a first chamber formed by filter rack 46 and a second chamber below and adjacent to the filter rack 46 formed by hollow passage 45 for providing exhaust airflow. In FIGS. 1A and 1B, top surface 54 of the filter cart 40 is divided at junction 58 providing a separation between incoming and outgoing airflow. A wall 36 is provided at the junction 58 of the filter cart 40 to isolate airflow through filter media elements 32. Handle 60 provides convenient access for movement of filter cart 40 by the operator 28.

In FIG. 1A, the filter cart 40 is shown in operation with the spray booth 10 such that the filter cart 40 is located in under section 24 below the spray booth 10. The operator 28 positions the filter cart 40 in a loaded position over a lift 72 operatively positioned in the floor 26 of the under section 24. Once positioned, locks 80 are operated to hold the cart 40 at the loaded position, then subsequently the lift 72 is actuated to raise the filter cart 40 such that seals 56 make contact with hood 30 defined as an under section inlet and exhaust duct 34 defined as an under section outlet, respectively, which is defined as an operable position of the movable cart. This provides sealing and isolation for the airflows entering and exiting from the filter cart 40. In another approach, the filter cart 40 can be raised by a lifting mechanism (e.g., a scissor jack, an inflatable jack, a hydraulic jack, etc.) directly coupled to the housing such that the filter cart 40 is raised for sealing by itself such that the filter cart 40 is moved in the operating position from the loaded position. As shown in FIG. 1A, the contaminated air exiting through the hood 30 having the under section inlet enters into a housing inlet 41 of the filter cart 40 and the filtered air passing through the filter media elements 32 exits through a housing outlet 43 to the exhaust duct 34 of the spray booth 10. Further, FIG. 1B shows a cross-sectional end top view of filter carts 40 and exhaust ducts 34 from the floor gate 22 of the spray booth 10. As shown in an exemplary embodiment of FIGS. 1A and 1B, four filter carts 40 are arranged side by side and in operation in the paint spray booth 10.

FIG. 2 also provides an illustration of airflow through the filter cart 40*a* as described above. Polluted (contaminated) airflow is shown entering downwardly through the top surface 54 into filter media elements 32 reaching the housing inlet 41. After exiting the lower portion of filter media elements 32, the airflow is directed into a lower chamber (hollow passage) 45 where it changes direction and moves upwardly into the housing outlet 43 and upwardly across top surface 54 that is connected to the booth's exhaust duct 34 (shown in FIG. 1A). In some instances, accumulated paint or spray may form droplets which will fall into collection bin 66 arranged (or removably attached) at the bottom of filter cart 40*a* where it can be collected and then drained or disposed of. Filter media elements 32 can be easily removed from filter rack 46 for replacement when they become fouled from collecting overspray. The units are replaced as needed with fresh filter media elements 32.

Figure 3:
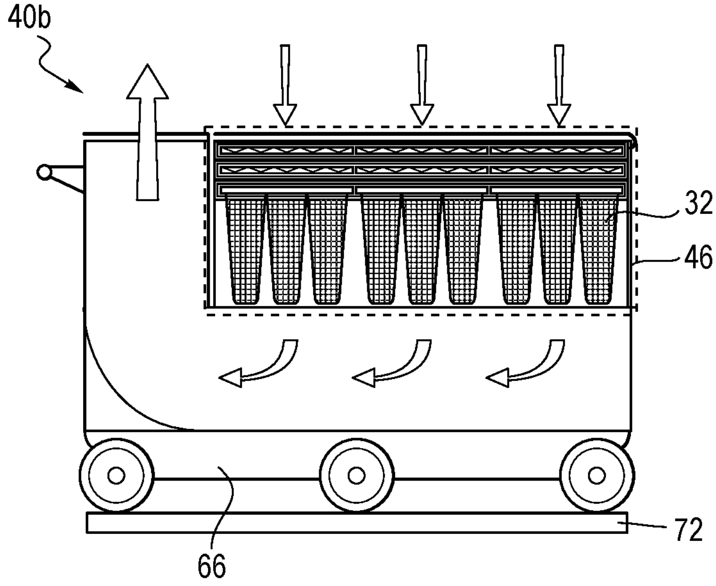
FIG. 3 is a side schematic view of a filter cart having different filter arrangements in accordance with another embodiment of the present disclosure.

FIG. 3 shows a second exemplary embodiment of filter cart 40*b* in accordance with this invention. Filter cart 40*b* differs from the filter cart 40*a* in the type of filter media elements 32 used. In the filter rack 46 of the filter cart 40*b*, filtration levels 1 and 2 are provided by removable panel type filters whereas filtration level 3 is provided by bag type filters. In other respects, filter cart 40*b* operates like the filter cart 40. The decision regarding which filter arrangement to use in the cart depends on the paint characteristics, the filtration capacity, the performance of the filters, the painting process, the user preference, the filter availability, etc.

Figure 4A:
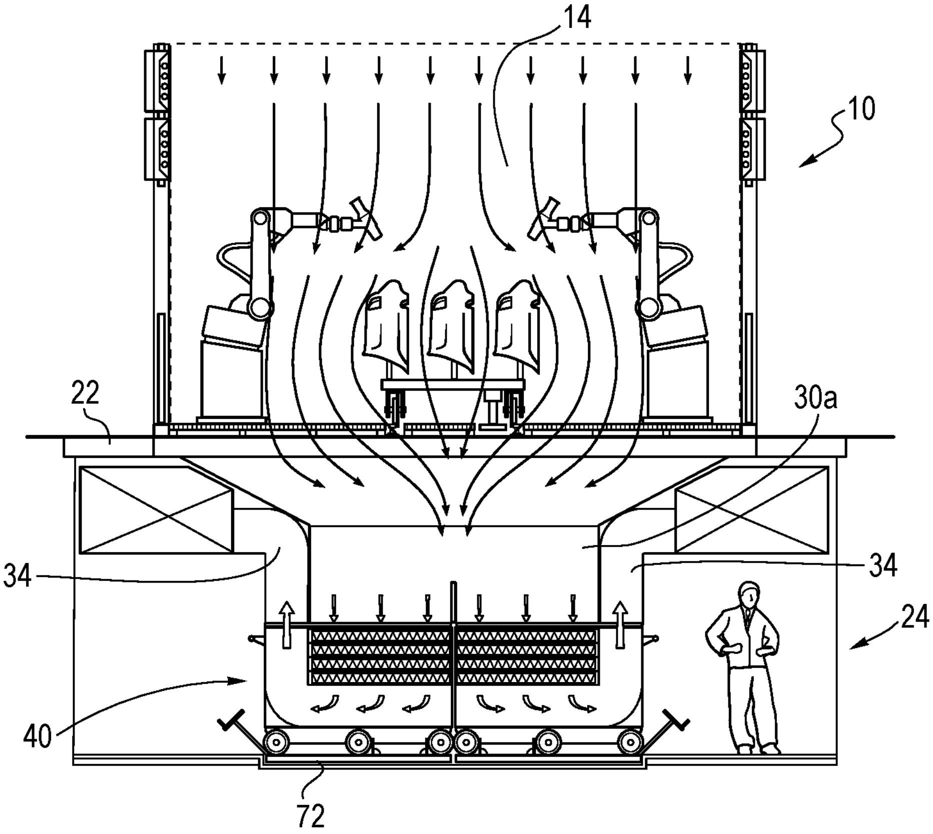
FIG. 4A is a cross-sectional end side view of a filter cart with the spray booth in accordance with another exemplary embodiment of the present disclosure.
Figure 4B:
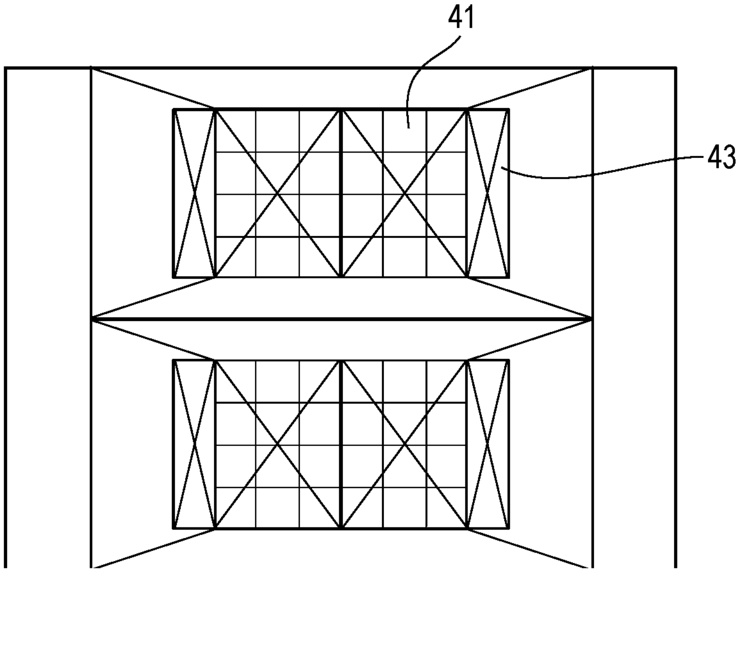
FIG. 4B is a corresponding cross-sectional end top view of FIG. 4A.

FIGS. 4A and 4B illustrate side and cross-sectional end top views of a fourth embodiment of the invention. For simplicity and for comparison purposes, the top view presents a potential arrangement for a presumed typical length unit module, for example 20 feet long. In this case, a pair of filter carts 40 is symmetrically arranged in the under section 24. Hood 30*a* having the under section inlet is modified to accommodate two of the filter carts. In this case, filter carts 40 are positioned for filtration from two sides, or they can be loaded in a serial manner from one side. Again lift 72 raises the units for sealing after they are docked in place. In this case, separated exhaust ducts 34 are provided. This spray booth 10 is generally symmetrical about a vertical plane through spraying bay 14. FIG. 4B shows a top view of filter carts 40 and exhaust ducts 34 from the floor gate 22 of the spray booth 10. FIG. 4B also illustrates that, in this embodiment, four separate filter carts 40 are used, two loaded from each side of under section 24. The embodiment shown in FIGS. 4A and 4B are generally intended for use in high booth airflow applications and/or where high overspray generation is expected. Filter media elements 32 are presented here as solid blocks for illustrative purposes. As presented before, any combination of different types filter media elements can be used in the filter rack having at least one level filtration (see FIGS. 1A, 2, and 3).

Figure 5A:
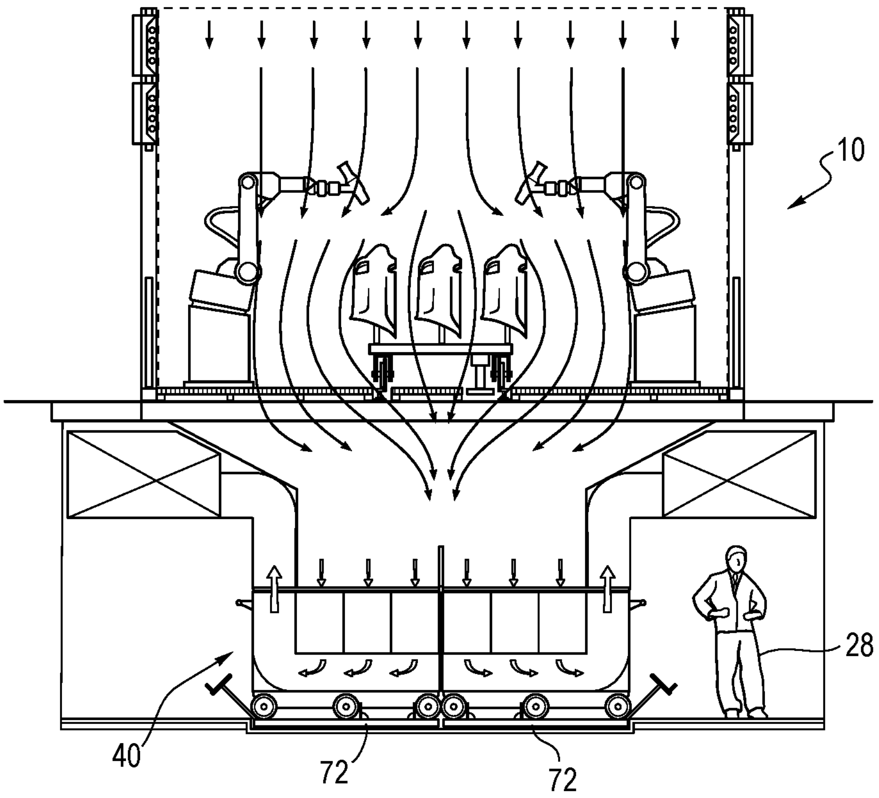
FIG. 5A is a cross-sectional end side view of a filter cart with the spray booth in accordance with another exemplary embodiment of the present disclosure.
Figure 5B:
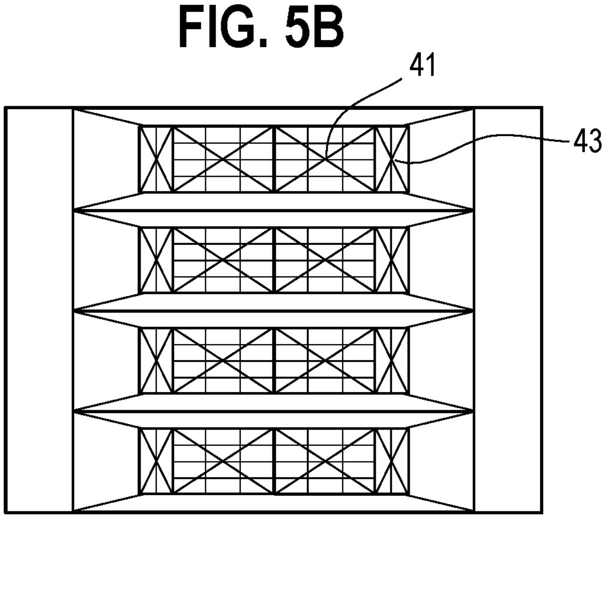
FIG. 5B is a corresponding cross-sectional end top view of FIG. 5A.

FIGS. 5A and 5B illustrate a fifth embodiment of the present invention. In this example, eight smaller filter carts 40 are used with four pairs each meeting at the centerline of under section 24. Compared to the fourth exemplary embodiment of FIGS. 4A and 4B, smaller filter carts 40 are lighter and easier for the operator 28 to maneuver. As described in the fourth embodiment, lift 72 raises each of the cart units into a sealing position after they are locked into a position defined as a docked position. After that, the lift 72 can be arranged to be separately operated for each filter cart 40 for sealing the air flow between the paint spray booth 10 and the filter cart 40.

Figure 6A:
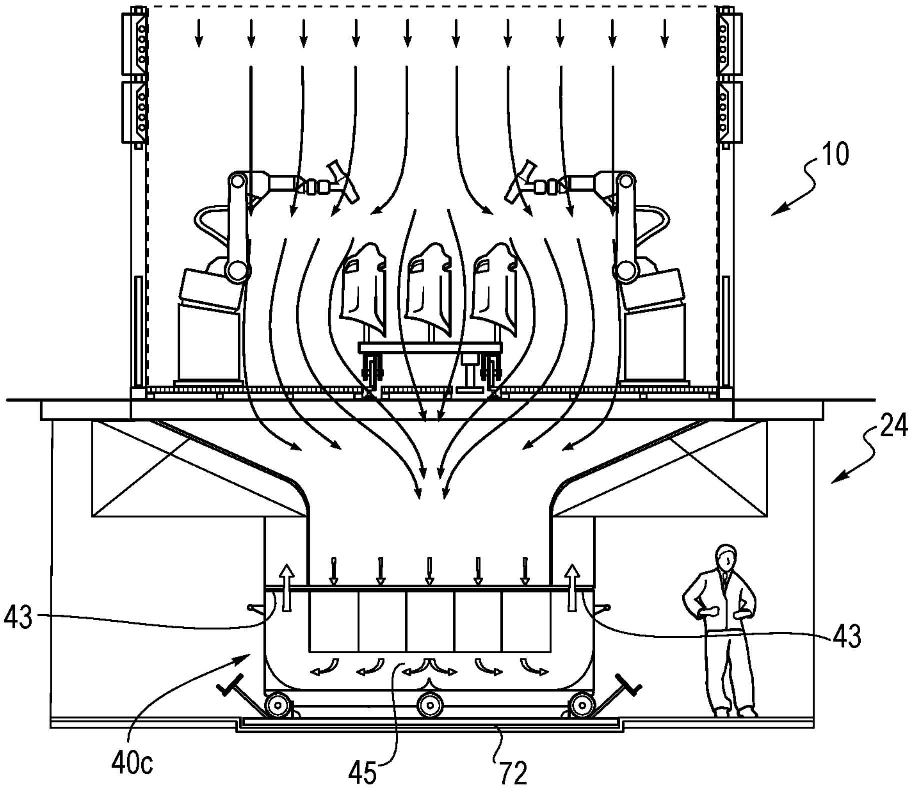
FIG. 6A is a cross-sectional end side view of a filter cart with the spray booth in accordance with an exemplary embodiment of the present disclosure.
Figure 6B:
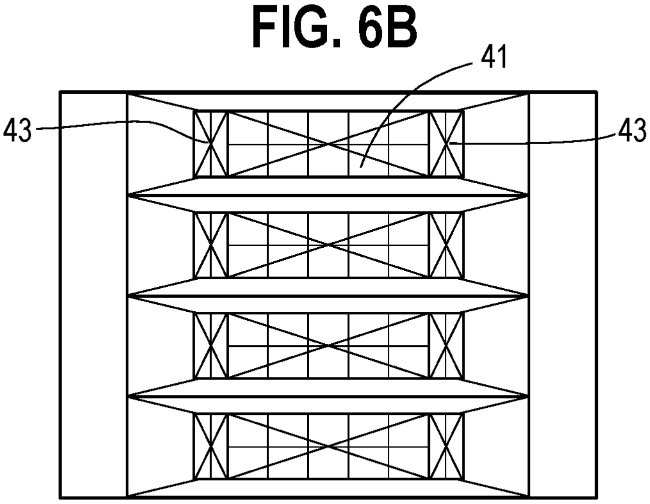
FIG. 6B is a corresponding cross-sectional end top view of FIG. 6A.

FIGS. 6A and 6B illustrate a sixth embodiment of the invention. In this case, a modified version of filter cart 40*c* is used. In accordance with the sixth exemplary embodiment of FIGS. 6A and 6B, the filter cart 40*c* provides lower chamber (hollow passage) 45 which feeds two separate housing outlets 43 such that the length of the filter cart 40*c* is generally greater than other filter carts 40, 40*a*, and 40*b* shown in the exemplary embodiments of FIGS. 1A, 2, 3, 4A, and 5A described above.

Figure 7:
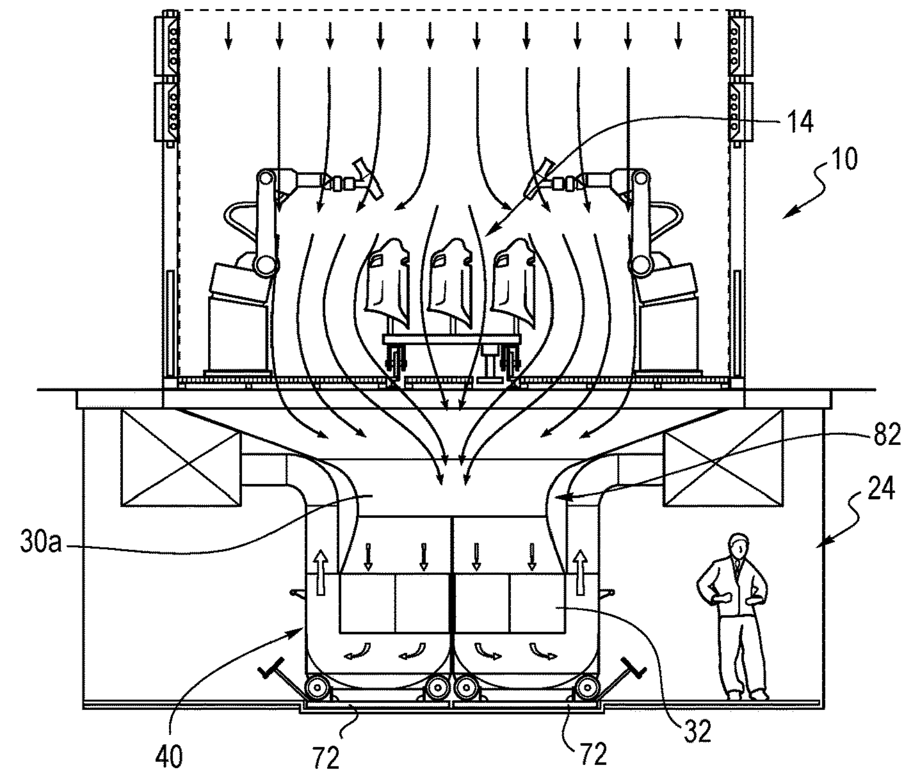
FIG. 7 is a cross-sectional end side view of a filter cart with a spray booth in accordance with an exemplary embodiment of the present disclosure.

FIG. 7 illustrates a seventh exemplary embodiment of the present invention. As shown in FIG. 7, eight smaller filter carts 40 (not shown) are used with facing pairs meeting at the center plane of the spray booth 10, which is similar to FIGS. 5A and 5B. Lifts 72 can be separately operated for each filter cart 40. Additionally, this embodiment of the present invention presents a nozzle-like contraction followed by an expansion 82 in the hood 30*a* having the under section inlet. This contraction-expansion feature 82 generates a localized pressure drop that helps stabilize airflow in the spraying bay 14.

Figure 8:
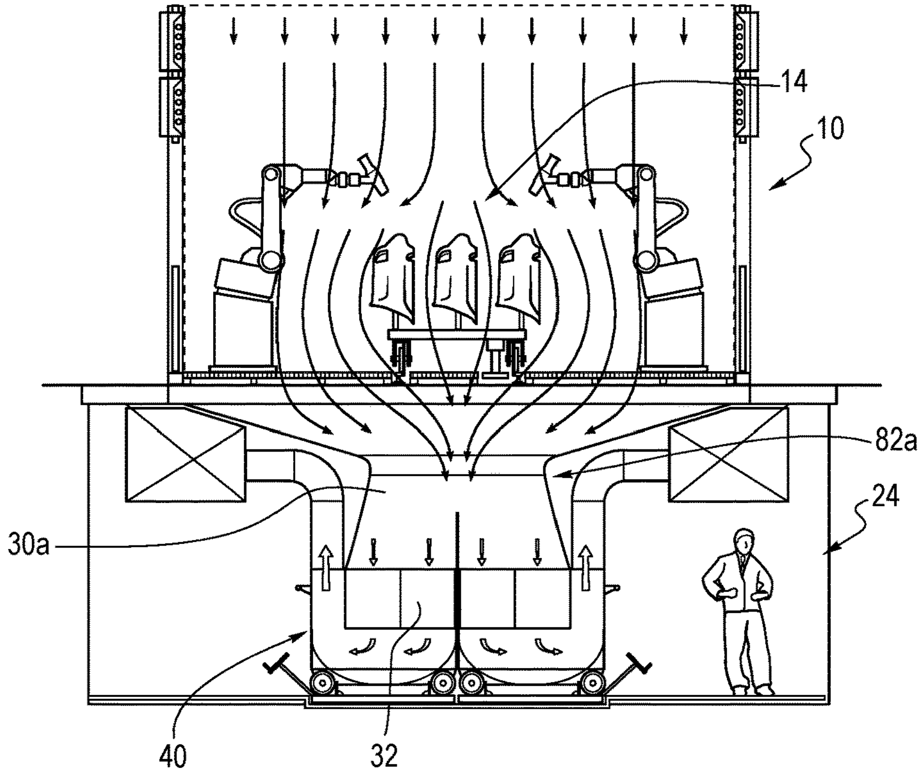
FIG. 8 is a cross-sectional end side view of a filter cart with a spray booth in accordance with an exemplary embodiment of the present disclosure.

FIG. 8 illustrates an eighth embodiment of the present invention. When painting, paint sprayers may be discreetly located in certain points along the booth. A nozzle like restriction 82*a* in the hood 30*a* before the air reaches the carts 40 with filters 32 is intended to reduce the effect of a nonuniform loading of filters, hence maintaining the balance of the air flow in the upper spraying bay 14. The seventh exemplary embodiment of FIG. 7 differs from FIG. 8 in the configuration of nozzles 82 and 82*a*. In the eighth embodiment of the present invention (see FIG. 8), the shape of the contraction in hood 30*a* is sharper, while the shape of the expansion is smoother, such that the hood 30*a* resembles a typical airflow venturi. Although perhaps more difficult to build, the configuration in this contraction-expansion pair typically generates less pressure losses than that of the embodiment illustrated in FIG. 7.

Figure 9A:
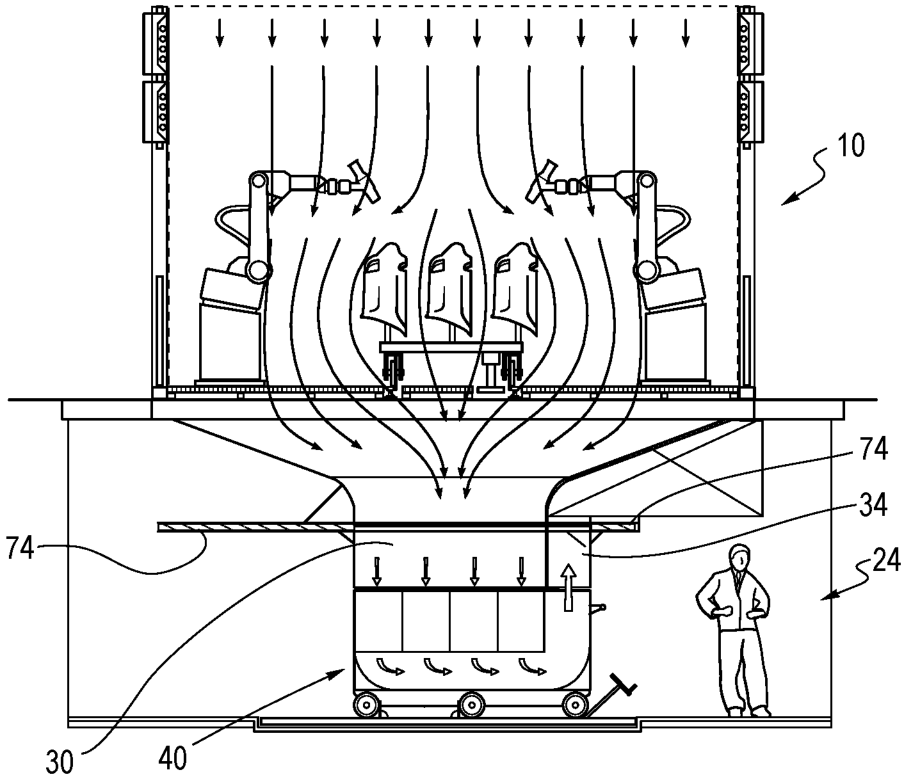
FIG. 9A is a cross-sectional end side view of a filter cart with a spray booth in accordance with an exemplary embodiment of the present disclosure.
Figure 9B:
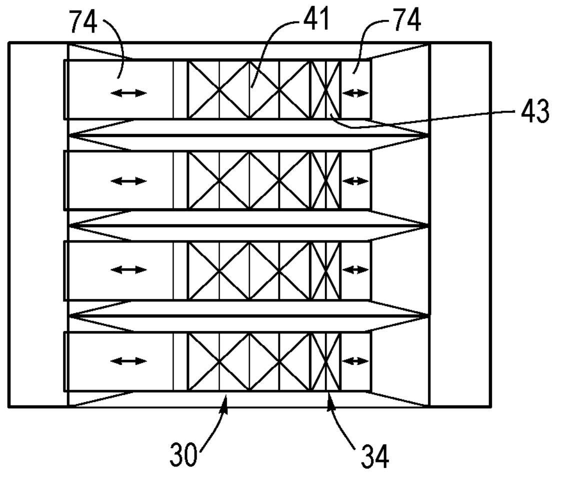
FIG. 9B is a corresponding cross-sectional end top view of FIG. 9A.

FIGS. 9A and 9B illustrate a ninth embodiment of the present invention. In this exemplary embodiment, four long but narrow filter carts 40 are arranged in a side-by-side arrangement in the under section 24. The illustration of FIG. 9A shows the presence of sliding doors 74 which can be moved in a guillotine-like manner to close off the air flow passages of hood 30 and exhaust duct 34 respectively. Sliding doors 74 can be operated to close when the filter carts 40 are removed for replacement of filter media elements 32 or other servicing. These sliding doors 74 allow the filter carts 40 to be removed and replaced while the paint spray booth 10 is in operation. Under certain circumstances, the use of the sliding doors 74 may allow replacement of the cart 40 with filters without having to stop the spray booth 10 or, at least, without having to stop the airflow to other carts in the spray booth 10. This may allow to continue painting operations while the filters are being replaced, hence eliminating down time of the operation. When compared with the exemplary embodiments presented in FIG. 4A or 5A, this exemplary embodiment of FIGS. 9A and 9B has a reduced number of filters per unit length. Since for a given filter the ideal air speed for capturing efficiently is well documented to be within a range, a configuration like that presented in FIGS. 9A and 9B may represent a spray booth suitable for operations that allow less airflow to pass through the spraying section like, for example, robotic spray painting. As mentioned before, a configuration like those presented in FIGS. 4A, 4B, 5A, and 5B may represent booths suitable for operations that require more airflow to pass through the spraying section like, for example, manual spray painting.

Figure 10A:
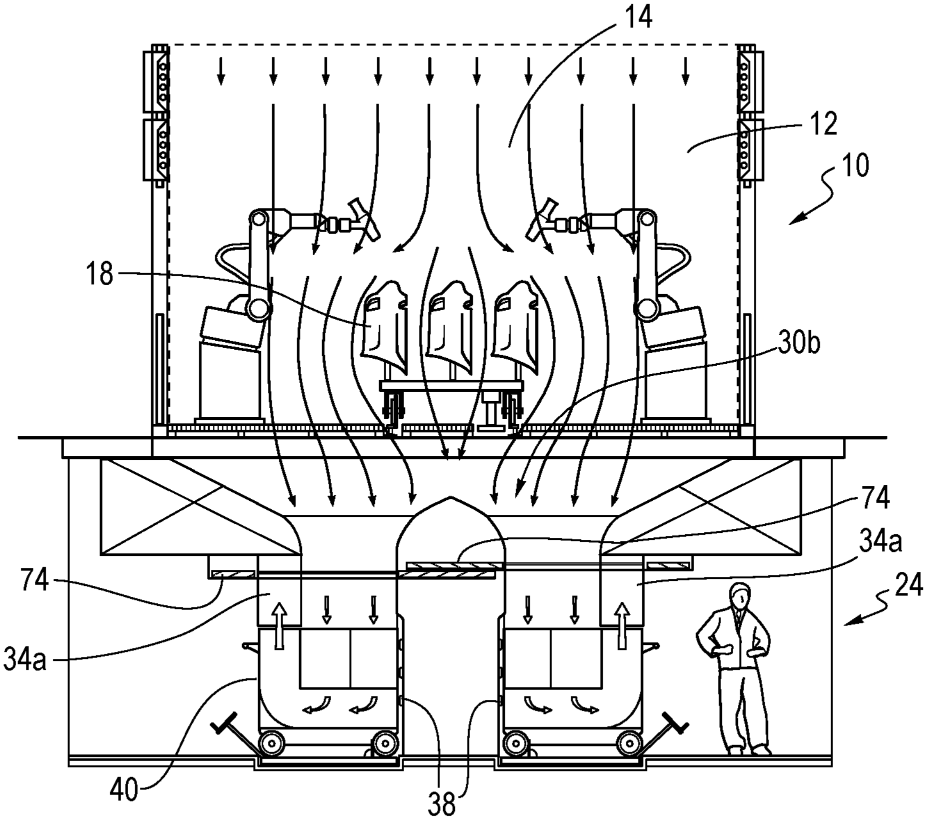
FIG. 10A is a cross-sectional end side view of a filter cart with a spray booth in accordance with an exemplary embodiment of the present disclosure.
Figure 10B:
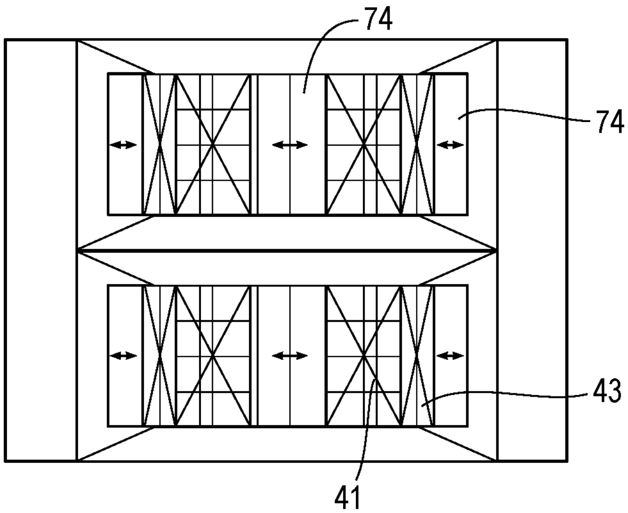
FIG. 10B is a corresponding cross-sectional end top view of FIG. 10A.

FIGS. 10A and 10B illustrate a tenth embodiment of the present invention. As shown in the exemplary embodiment of FIGS. 10A and 10B, four short but wide filter carts 40 are arranged side-by-side and operated in the under section 24. In this example facing pairs of filter carts 40 are separated using modified exhaust ducts 34*a*, which are also separated. In FIGS. 10A and 10B, separate operable sliding doors 74 are provided for each of the facing sets of filter carts 40. As in the case of lifts 72, sliding doors 74 can be separately provided for each filter cart 40 or can operate for two or more filter carts. As shown in FIG. 10A, modified hood 30*b* (divided into smaller size) may provide a better airflow pattern in spray booth enclosure 12 to more closely follow a purely downward vertical direction across articles 18. Smaller carts and doors allow replacing filters "on the fly" while minimizing effects on the airflow in booth spraying bay 14. The filter carts 40 are pushed horizontally against a wall with bumpers 38. The two walls with bumpers 38 define an aisle for accessing mechanisms of the sliding doors 74.

Figure 11A:
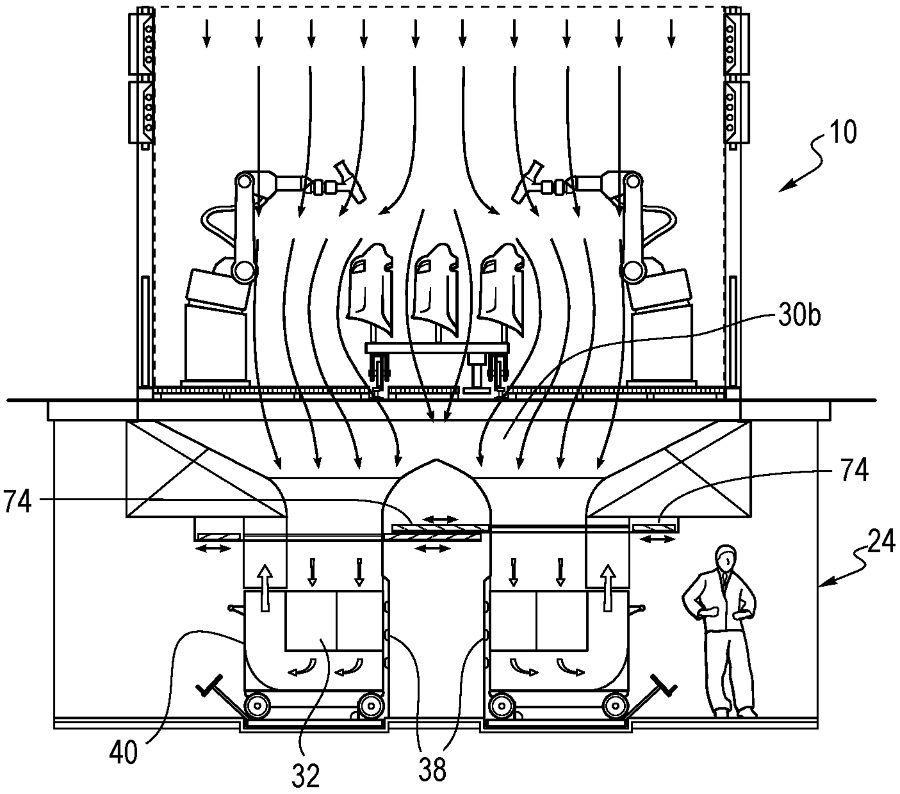
FIG. 11A is a cross-sectional end side view of a filter cart with a spray booth in accordance with an exemplary embodiment of the present disclosure.
Figure 11B:
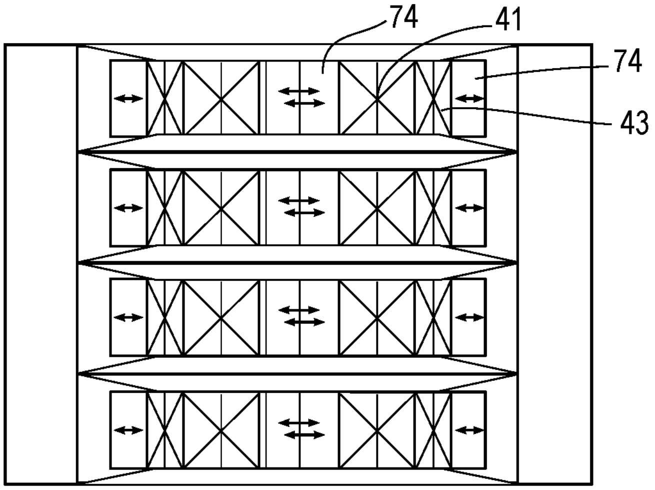
FIG. 11B is a corresponding cross-sectional end top view of FIG. 11A.

FIGS. 11A and 11B illustrate an eleventh embodiment of the present invention showing use of eight filter carts 40 with a separated inlet hood 30*b* and sliding doors 74. As illustrated a set of sliding doors 74 are provided for isolating a filter cart 40 while a filter media element 32 is being changed for example during operation. This embodiment is similar to the tenth embodiment of FIGS. 10A and 10B. However, this embodiment uses smaller, lighter, easy to maneuver the filter carts 40. The filter carts 40 are locked in place against a pair of walls with bumpers 38, which define an aisle for accessing sliding door mechanism.

Figure 12A:
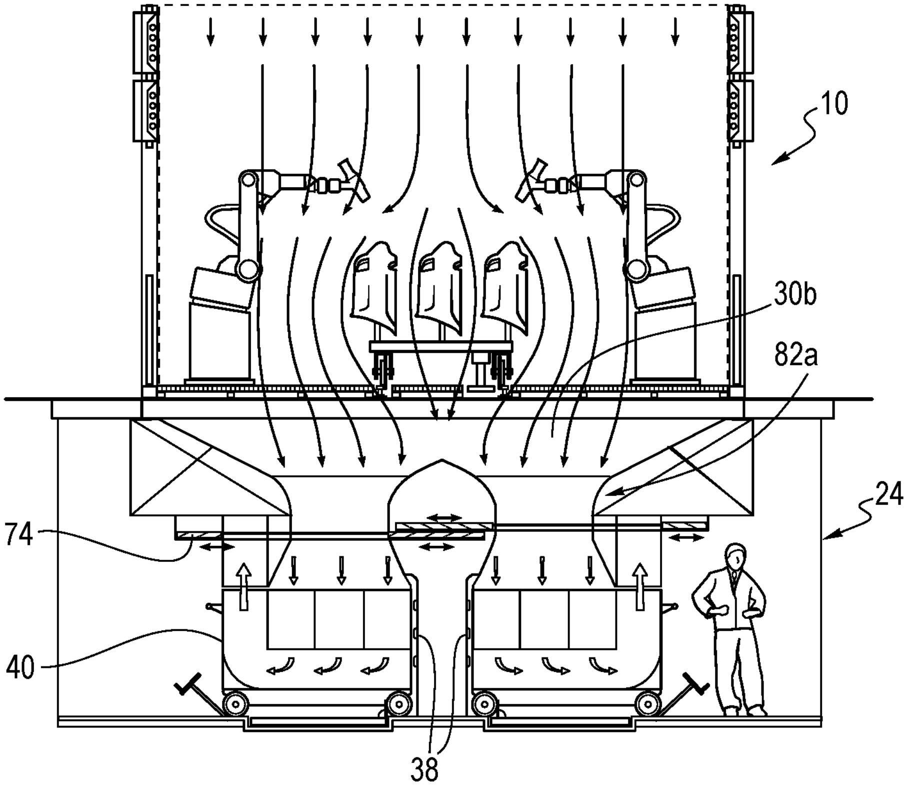
FIG. 12A is a cross-sectional end side view of a filter cart with a spray booth in accordance with an exemplary embodiment of the present disclosure.
Figure 12B:
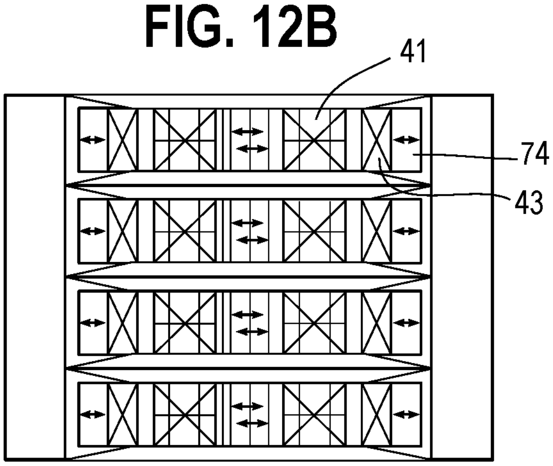
FIG. 12B is a corresponding cross-sectional end top view of FIG. 12A.

FIGS. 12A and 12B illustrate a twelfth embodiment of the present invention. This embodiment is similar to that illustrated in FIGS. 11A and 11B, with a slight change in the configuration of the hood 30*b* by adding nozzles 82*a* intended to provide a desired flow restriction. As described above, this contraction-expansion 82*a* in the hood 30*b* helps stabilize the airflow in the spraying section as well as sliding doors 74 that can be operated individually for each cart or in unison for all carts. When compared with the eleventh embodiment of FIGS. 10A and 10B, this embodiment uses longer filter carts 40 (same width) which increases the filter area and allows for larger airflow handling. As in the eleventh embodiment, the filter carts 40 dock against a wall with bumpers 38, defining an aisle for accessing the mechanism for the sliding doors 74.

Figure 13A:
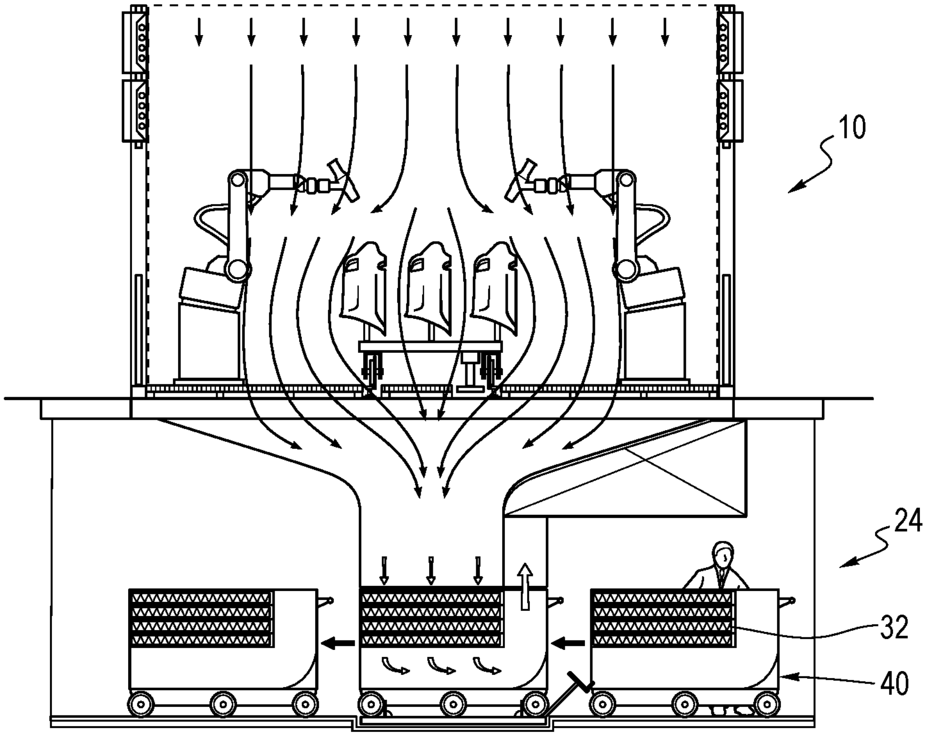
FIG. 13A is a cross-sectional end side view of the filter cart used in the spray booth of FIG. 1A.
Figure 13B:
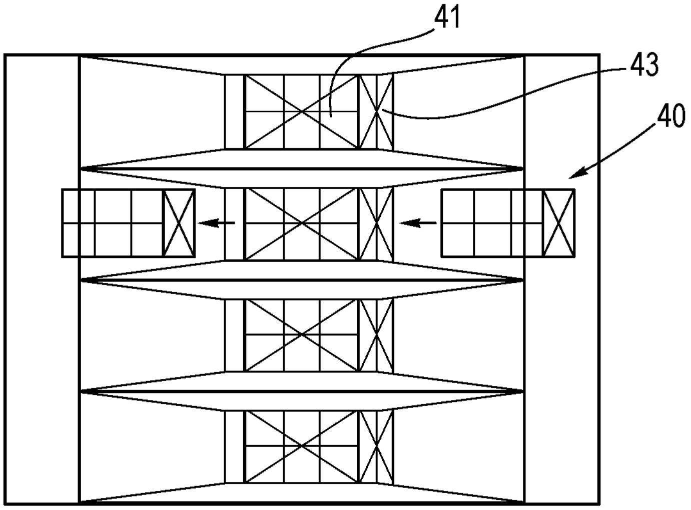
FIG. 13B is a corresponding cross-sectional end top view showing an operation of the system, which has an arrangement for movement of the filter carts.

FIGS. 13A and 13B illustrate a thirteenth embodiment of the present invention showing a schematic of the filter cart replacement operation. The system shown is similar to the first embodiment (see FIGS. 1A and 1B) described above but shows movement of filter carts for changing the filter media elements 32. FIG. 13A shows three filter cart positions with a flow-through operation in which carts with new clean filters are moved in the left-hand direction into position for filtration and after they need to be replaced, are again moved to the left-hand side of under section 24 where the carts with the dirty filters can be then taken to the cart cleaning/filter disposal station (not shown). This means of operation describes a clean cart/clean filters pathway (in the right hand side of under section 24) and a dirty cart/dirty filters pathway (in the left hand side of under section 24). The top view of FIG. 13B also shows such cart movement. Other path directions are also possible.

Figure 14A:
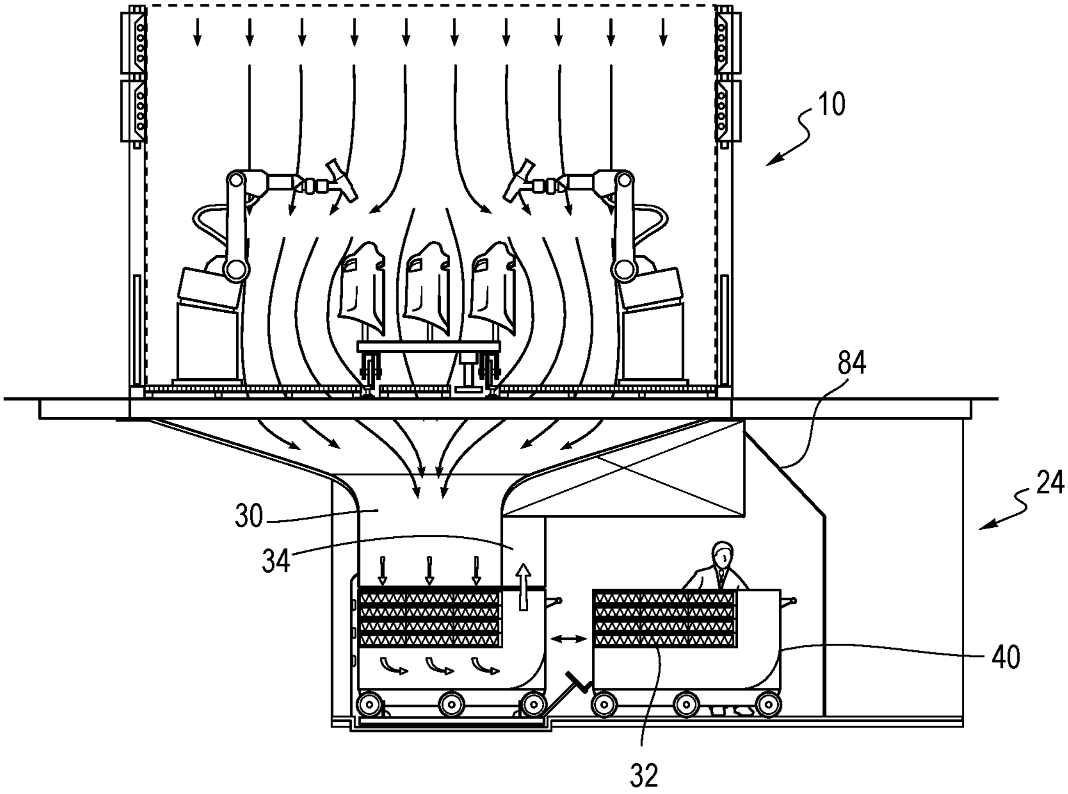
FIG. 14A is a cross-sectional end side view of the filter cart used in the spray booth of FIG. 1A.
Figure 14B:
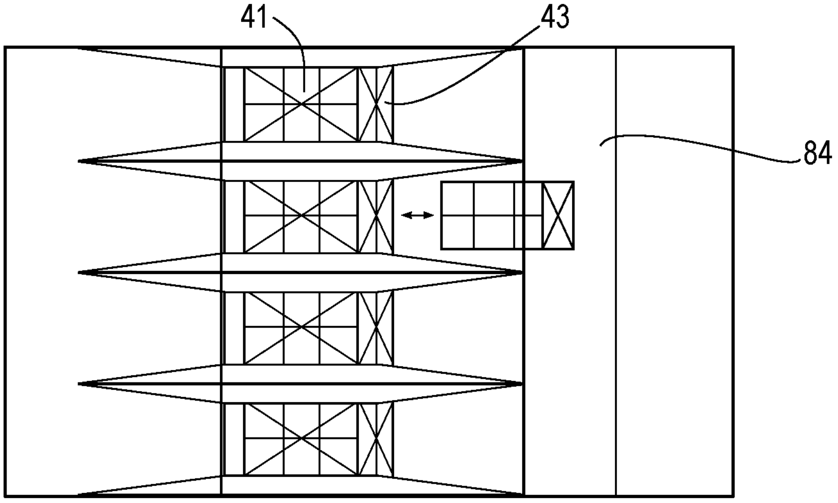
FIG. 14B is a corresponding cross-sectional end top view showing an operation of the system, which has an alternate arrangement for movement of the filter carts.

FIGS. 14A and 14B show another schematic of operation in which the carts are accessed only from one side of the under section 24 and both clean carts/clean filters and dirty carts/dirty filters are handled through the same (clean or dirty) pathway. When compared with the thirteenth embodiment of FIGS. 13A and 13B, the advantage of this configuration is that it reduces the volume to be dug for the under section pit (digging for the left-side pathway is not needed). The disadvantage is that now the pathway for handling clean cart/clean filters would be substantially dirtier. As shown in FIG. 14A, the filter carts 40 move in the left-hand direction to place them in position for filtration, and are removed to the right for servicing. To avoid exposure of non-trained, non-protected or non-authorized personnel to the paint residue and fumes, this embodiment of the present invention further presents a containment wall 84. These figures show a containment that is intended to isolate the filter carts 40 contaminated with paint from the plant or personnel moving through the aisle to the right side of the containment.

Figure 15A:
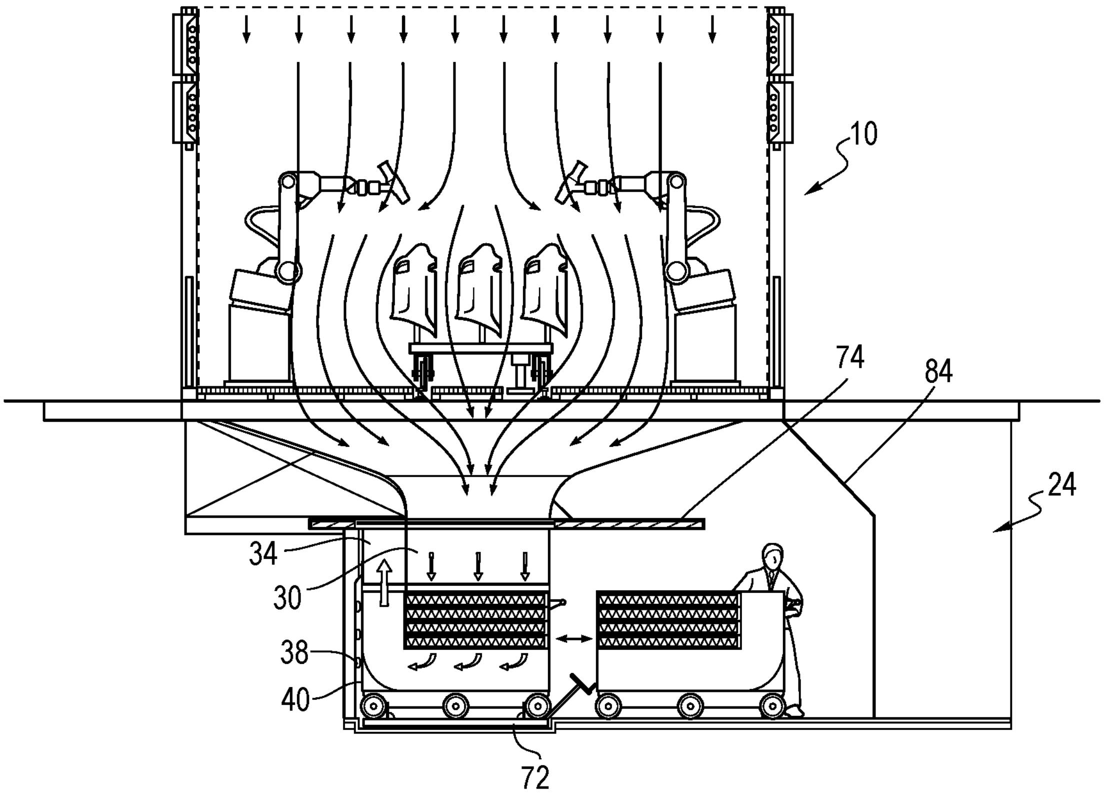
FIG. 15A is a cross-sectional end side view of the filter cart with sliding doors formed in a spray booth of FIG. 14A.
Figure 15B:
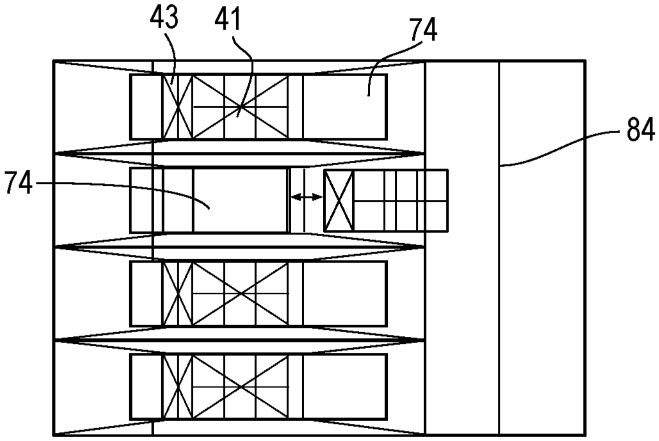
FIG. 15B is a corresponding cross-sectional end top view showing operation of a system using the modified example of FIG. 15A.

FIGS. 15A and 15B show another schematic of the filter cart operation. In this case, exhaust duct 34 is positioned to the left of the filter media elements 32 but otherwise is used in a manner equivalent to that shown in FIGS. 14A and 14B. In addition, sliding doors 74 may be used to close both the hood and the exhaust duct while the filter carts 40 are being replaced. FIGS. 15A and 15B also display the containment wall 84. When doors are not present, the booth or section of the booth may need to be stopped for the filter carts to be replaced, allowing carts to be replaced only between shifts or at night. The sliding doors may allow the filters to be replaced while the booth is in operation.

Figure 16A:
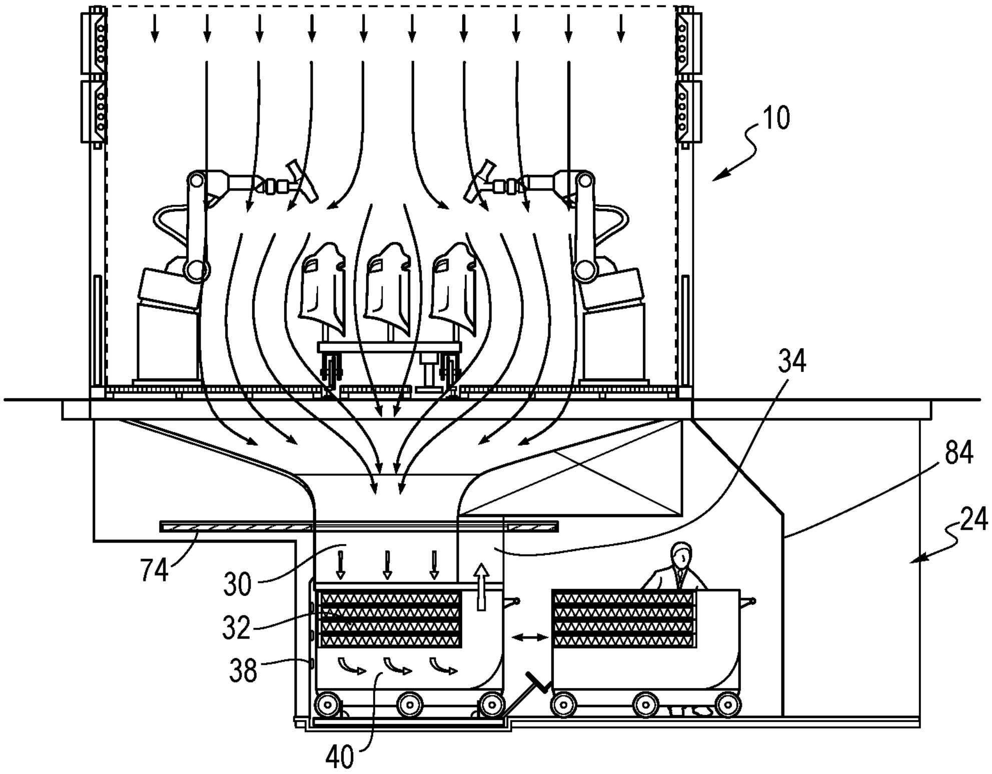
FIG. 16A is a cross-sectional end side view of a filter cart with different sliding doors formed in a spray booth of FIG. 15A.
Figure 16B:
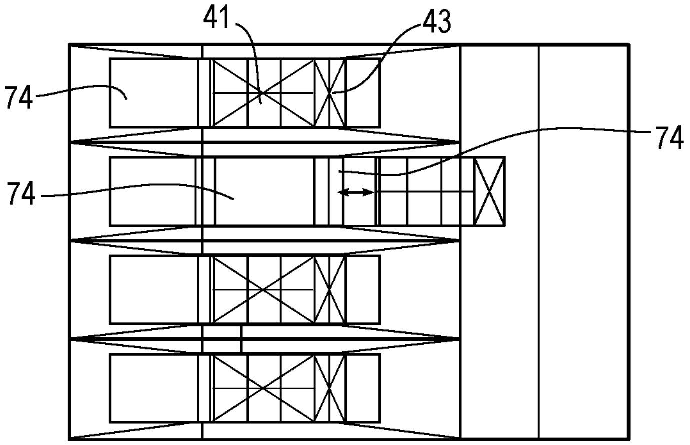
FIG. 16B is a corresponding cross-sectional end top view showing operation of a system using the modified example of FIG. 16A.
Figure 17:
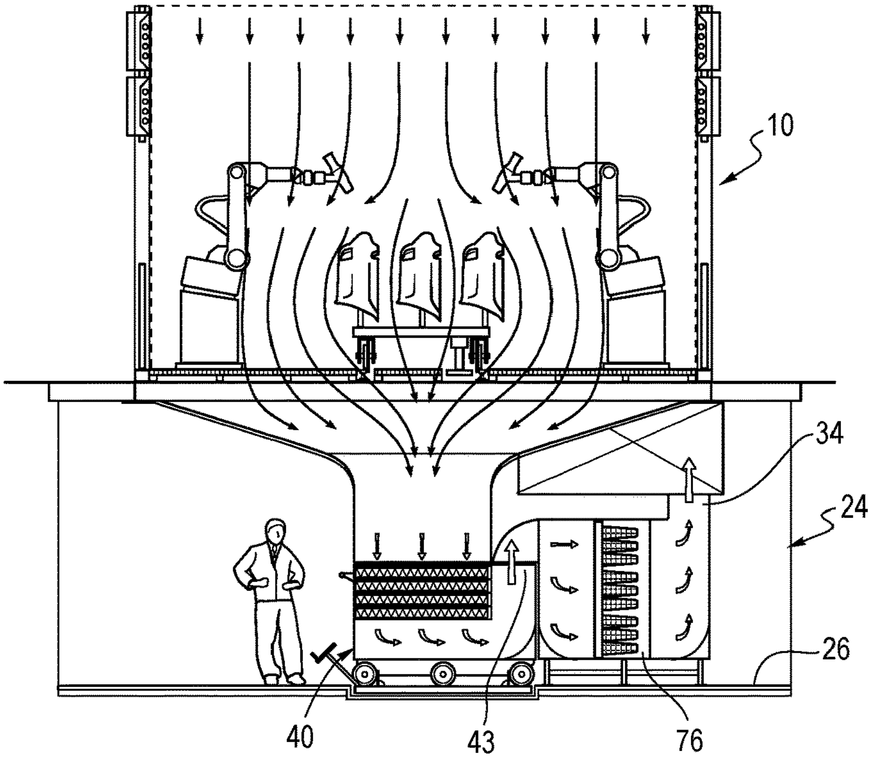
FIG. 17 is a cross-sectional end side view of a filter cart with the spray booth of FIG. 1A, using an additional fixed filter house structure with vertically arranged filter elements.
Figure 18:
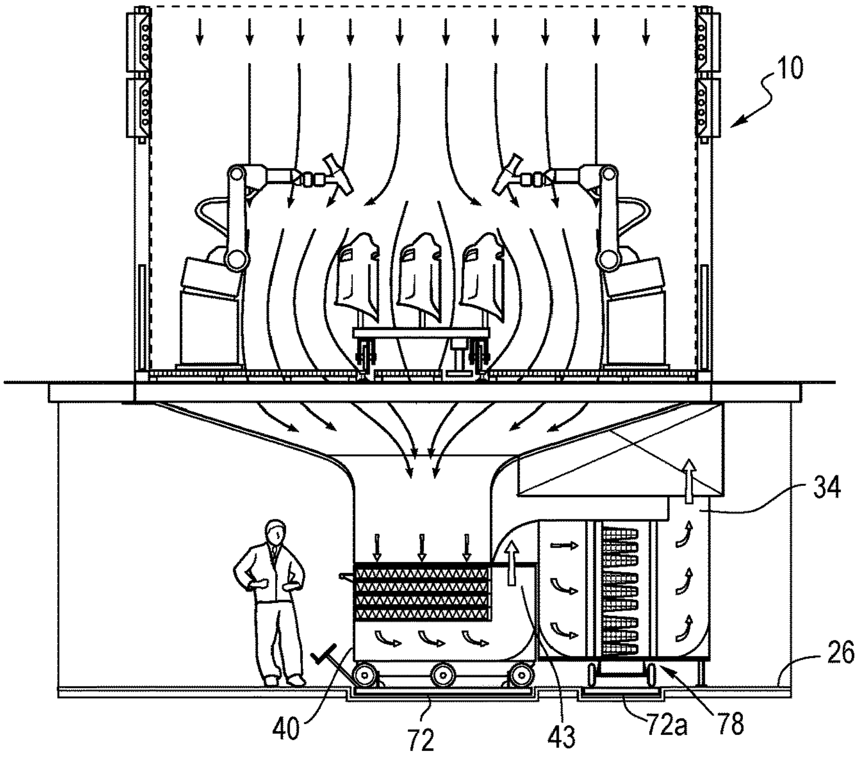
FIG. 18 is a cross-sectional end side view of the filter cart with the spray booth of FIG. 1A, using a separate filter cart with vertically arranged filter elements.

FIGS. 16A and 16B show another schematic of the filter cart operation. These figures show the presence of sliding doors 74 and a containment wall 84. This configuration is similar to that presented in FIGS. 15A and 15B but the position of the filter cart 40 and exhaust duct 34 are mirrored from the central vertical axis of the spray booth 10. This results on the exhaust duct 34 to be more easily accessed than in FIGS. 15A and 15B. The space between the hood 30 and the left hand side sliding door 74 is used for accessing that sliding door mechanism As described above, filtration occurs only at the filter cart 40 with several levels of coarse-to-fine filtration (for example, see FIG. 1A). In accordance with a seventeenth embodiment of the present invention, FIG. 17 shows filtration occurring both at the filter cart 40 and at a fixed post-filtration house. In certain paint operations, depending on the over spray droplet size distribution generated, it may be convenient, and some times more cost effective, to provide several levels of coarse inexpensive sacrificial filtration at the filter cart 40 and supplement it with fine highly efficient filtration, which is typically more expensive. As shown in FIG. 17, the fine filtration is provided by fine filters placed inside the fixed filter house structure 76. To extend the life of the fine expensive filters, the filter carts 40 are replaced relatively more often. The end result is tightly filtrated exhaust airflow within a typically reduced expense. It is understood that the system would be designed so that the expensive fine filters provided in the fixed filter housing structure 76 would be changed only occasionally while the inexpensive coarse filters provided in the filter carts 40 would be changed relatively more frequently In addition, with the aim of minimizing down time, the supplemental fine filters in the exemplary embodiment of FIG. 18 can be designed to be also supplied by using a separate filter cart 78 instead of being placed inside a fixed filter house structure 76 such that the fine filters can be pre-loaded in the separate filter cart 78 and rolled in place in a manner similar to previously discussed instead of spending time for replacing the fine filters inside the fixed filter house structure 76. As described above, FIGS. 17 and 18 show two different embodiments having the post-filtration: 1) FIG. 17 shows an embodiment in which the fine supplemental filters are placed inside a fixed filter house structure 76; and 2) FIG. 18 shows an embodiment in which the fine supplemental filters are brought to place by rolling the separate filter cart 78 which can be moved into and out of position and sealed in a manner consistent with that described previously for filter carts 40 by using an additional lift 72*a* operatively arranged in the floor 26. The separate filter cart 78 arranged between the housing outlet and the exhaust duct is generally sealed by sealing clamps, inflatable types seals or other type of suitable seal may be used. In another approach, the seal method for the separate fine filter cart 78 may be similar to those mentioned for FIG. 1A.

Figure 19:
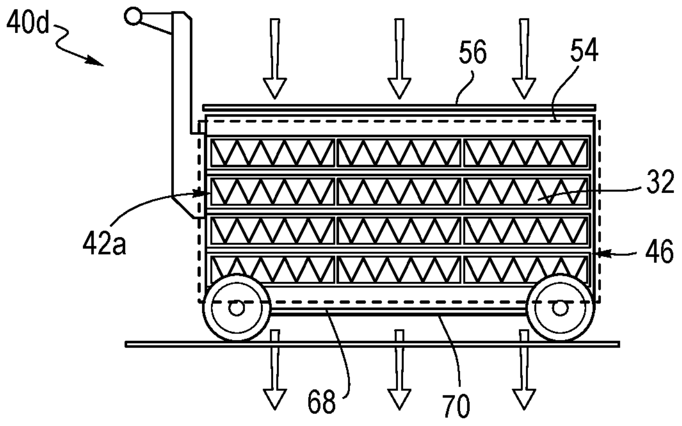
FIG. 19 is a side schematic view of an alternate embodiment of a filter cart in accordance with an exemplary embodiment of the present disclosure.

FIG. 19 shows another exemplary embodiment of a filter cart 40*d*. This filter cart 40*d* differs from the filter carts described in the prior embodiments in that it does not provide the hollow passage 45 inside the housing of the filter cart 40 for flow of air after passing through the filter media elements 32. Also, in the exemplary embodiment of FIG. 19, four levels of filtration are provided by the filter media elements. For this embodiment, container 42*a* further includes an open lower surface 68 having a housing outlet with a lower seal 70. Further, in FIG. 19, the filter cart 40*d* does not provide a collection area for accumulated liquids dripping from the filter media elements since this function is served by other components (not shown).

Figure 20:
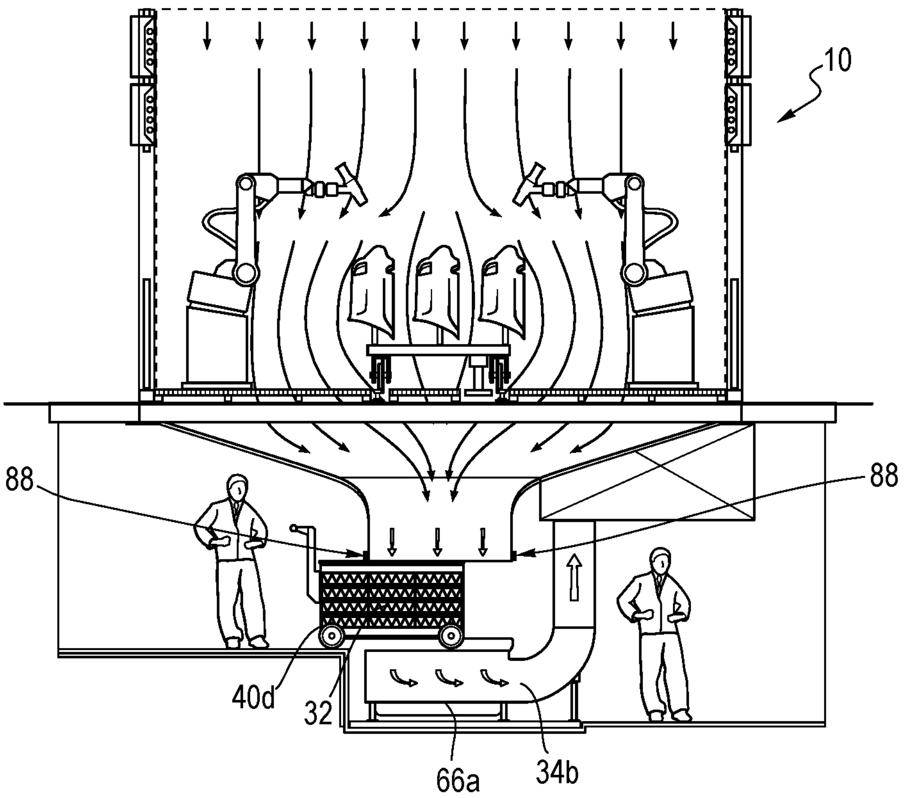
FIG. 20 is a cross-sectional end side view of a spray booth operation having the filter cart of FIG. 19.
Figure 21:
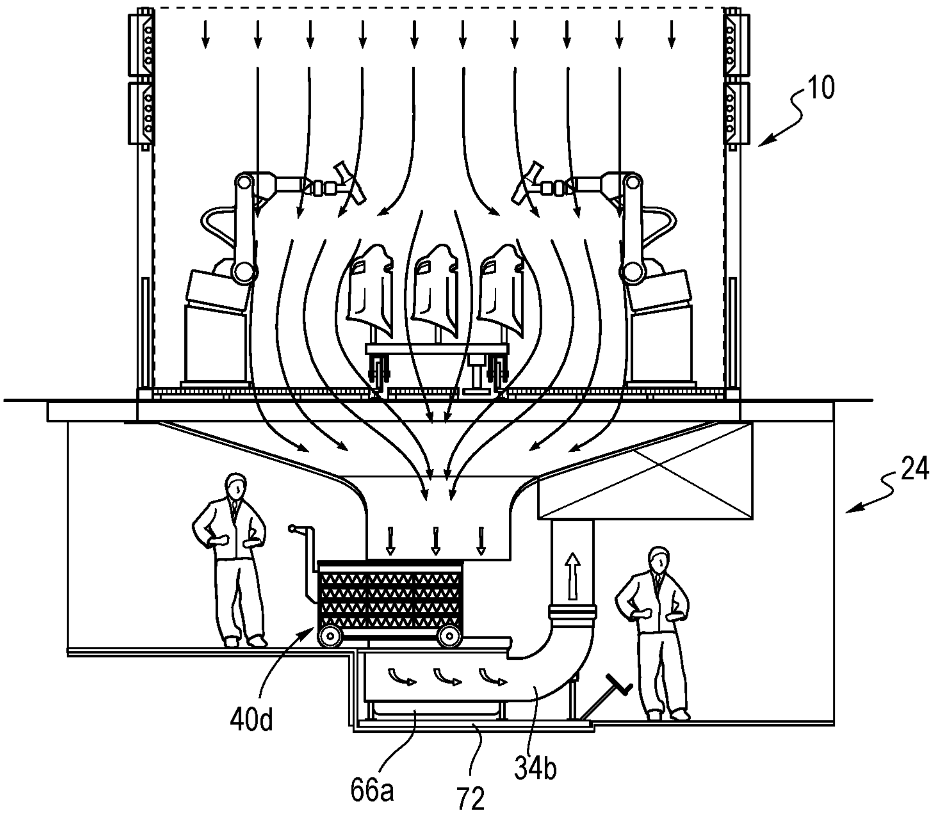
FIG. 21 is a cross-sectional end side view of another spray booth operation having the filter cart of FIG. 19.

FIGS. 20 and 21 show operation of the system using the filter cart 40*d* which provides for the container having only filter media elements 32. As shown in FIGS. 20 and 21, after passing through filter media elements 32 in the filter cart 40*d*, airflow moves below the filter cart 40*d* into exhaust duct 34*b* positioned underneath the cart. Accordingly, appropriate seals would be needed at the upper and lower perimeter surfaces of the filter cart 40*d* as shown in two different options presented in the exemplary embodiments of FIGS. 20 and 21. The embodiment of FIG. 20 is shown without provision of lift 72. In FIG. 20, instead, mechanical sealing clamps 88, inflatable type seals or other type of suitable seal may be used. Seals should be positioned to enlarge and reach sealing contact with facing surfaces when the filter cart 40*d* is docked in position. In the case of clamps, they may be disengaged when the filter cart 40*d* needs to be removed. In the case of inflatable seals, they may be deflated when it is desired to remove the filter cart 40*d*. In this configuration, a collection bin 66*a* is a part of the exhaust structure and is located below the filter cart 40*d* at the bottom of exhaust duct 34*b* and can be accessed for cleaning and inspection purposes when the filter carts are removed. Further, the collection bin 66*a* includes a drain outlet (not shown) to facilitates cleaning the exhaust duct 34*b* including the collection bin 66*a*.

The embodiment of FIG. 21 uses a lift 72 to raise the bottom section of the movable exhaust duct 34*b* that contains the collection bin 66*a* and the positioned filter cart 40*d* to provide the appropriate seal. This bottom portion of exhaust duct 34*b* is lifted and connected to the rest of exhaust duct by flexible ducting manner. Seals for this embodiment of FIG. 21 are similar to those used in, for example, the embodiment shown in FIG. 1A. The difference is that, instead of seals only at the generally horizontal top surface of the filter cart 40 (as in embodiment of FIG. 1A), in this embodiment of FIG. 21, seals are provided at the top surface and at a generally horizontal bottom (lower) surface of the filter cart 40*d*. To provide filters to the spray booth 10, the filter cart 40*d* is placed in position and locked defined as the loaded position of the movable cart. Then, when the lift 72 is actuated, the bottom section of the exhaust duct 34*b* is lifted and the seal at the bottom surface of cart 40*d* is engaged first. As the bottom of the movable exhaust duct 34*b* continues being lifted, it lifts the locked cart 40*d* engaging the upper seal, thus providing a full seal in the top and bottom surfaces of the filter cart 40*d* defined as the operating position of the movable cart. The process is reversed when the filter cart 40*d* with filters needs to be replaced.

Figure 22:
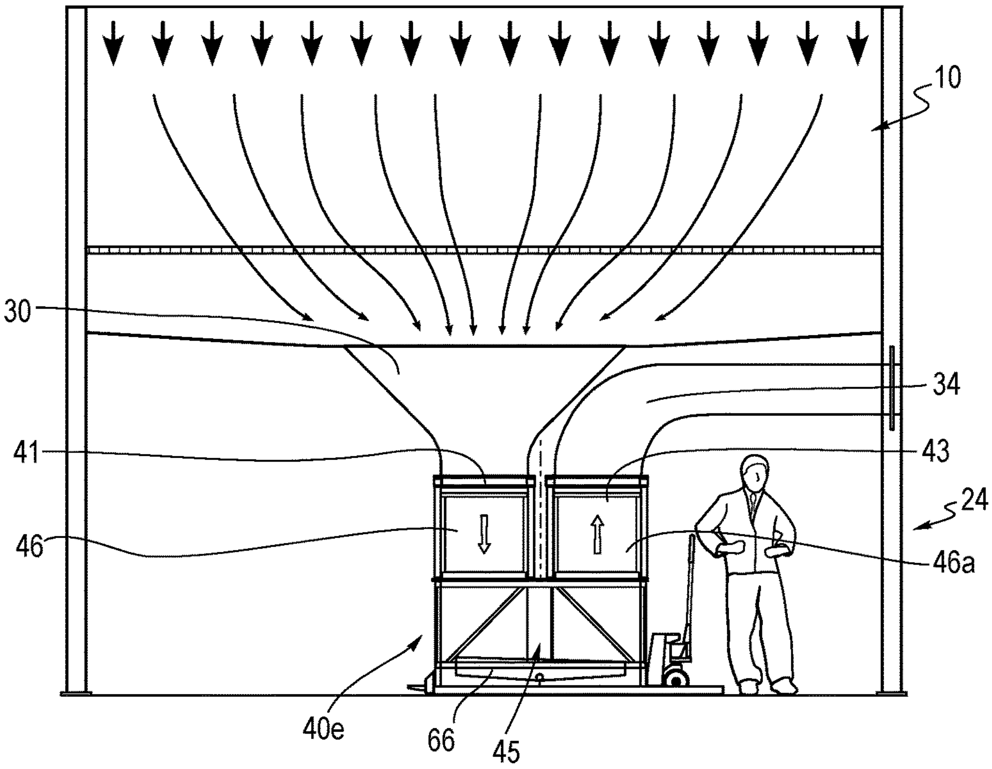
FIG. 22 is a cross-sectional end side view of a filter cart with a spray booth in accordance with another exemplary embodiment of the present disclosure.

FIG. 22 shows another exemplary embodiment of the present invention. This filter cart 40*e* differs from the filter cart 40 shown in FIG. 1A. In FIG. 22, the filter cart 40*e* includes an additional filter rack 46*a* arranged in the housing outlet 43 of the filter cart 40*e* such that the filter cart 40*e* has three different chambers inside the housing of the filter cart 40*e*. In the filter cart 40*e*, the first chamber having a filter rack 46 is located at the housing inlet 41 such that the contaminated air from the spray booth 10 flows into the first chamber. The filtered air passing through the filter rack 46 in the housing inlet flows through the second chamber formed with the hollow passage 45 located below the filter rack 46. Further, the filtered air passes through additional filter media elements 32 in another filter rack 46*a* arranged in the third chamber (housing outlet) of the filter cart 40*e*, then exits toward the exhaust duct 34. As shown in FIG. 22, further, the housing inlet and housing outlet of the filter cart 40*e* are spaced apart for providing a separation between incoming and outgoing airflow and also they are communicated via the hollow passage 45 below the filter racks 46 and 46*a*. Seals for this embodiment of FIG. 22 are similar to those used in, for example, the embodiment shown in FIG. 1A. In another approach, as shown in FIG. 22, the housing of the filter cart 40*e* is moved by a pallet jack instead of wheels attached to the housing such that the filter cart 40*e* is lifted by the pallet jack for sealing when the filter cart 40*e* is in operation in the spray booth. In FIG. 22, the filter cart 40*e* also includes the collection bin 66 having a drain outlet at the bottom of the filter cart 40*e* where the accumulated paint can be collected or disposed of, which is similar to those used in the embodiment shown in FIG. 1A.

Figure 23:
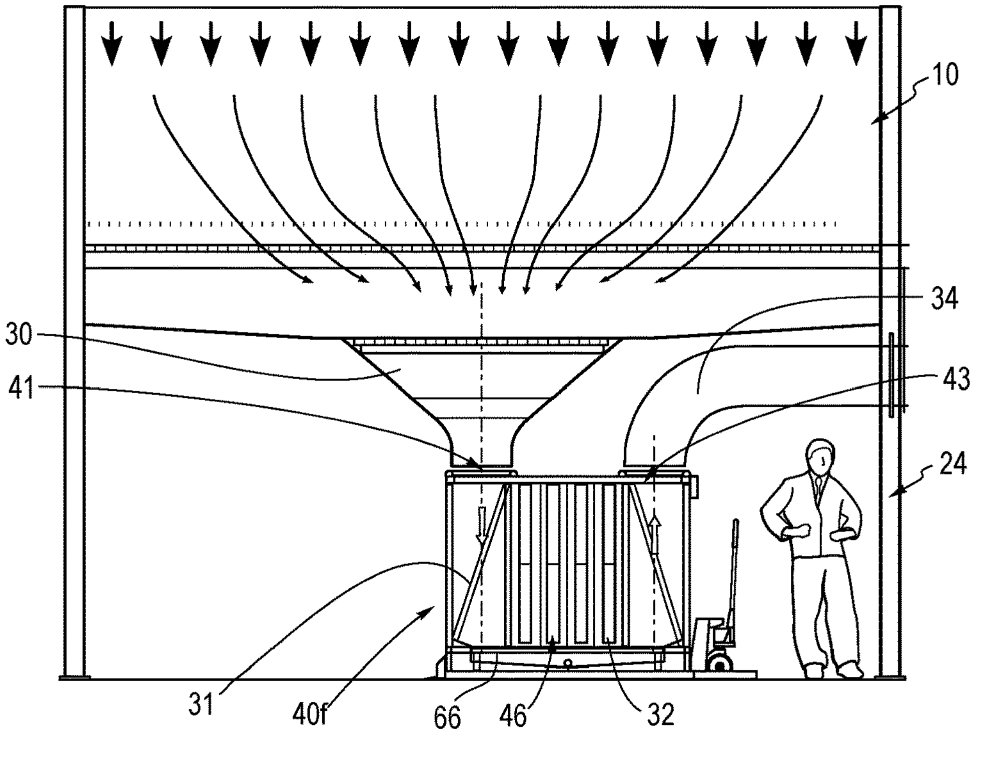
FIG. 23 is a cross-sectional end side view of a filter cart with a spray booth in accordance with another exemplary embodiment of the present disclosure.

FIG. 23 shows another exemplary embodiment of the present invention. This filter cart 40*f* differs from the filter cart 40*e* shown in FIG. 22. In FIG. 23, the filter cart 40*f* includes the filter rack 46 having vertically arranged filter media elements 32. The filter rack 46 of the filter cart 40*e* is arranged between the housing inlet 41 and the housing outlet 43. Further, the housing inlet of the filter cart 40*f* has a pre-filter 31 for providing coagulation process to collect accumulated paint or spray forming droplets which will fall to the collection bin 66 arranged (or removably attached) at the bottom of filter cart 40*f* where the accumulated spray or paint can be collected or disposed of, which is similar to those used in the embodiment shown in FIG. 22. After passing through the pre-filter, the contaminated air entering from the spray booth 10 passes through the filter media elements 32 vertically arranged in the filter rack 46, and then the filtered air exits toward the exhaust duct 34 via the housing outlet 43 defined as a chamber. In FIG. 23, for example, the filter cart 40*e* has the filter rack 46 having four levels, which are vertically arranged to receive the filter media elements 32 in the side-by-side arrangement. Further, seals for this embodiment of FIG. 23 are similar to those used in, for example, the embodiments shown in FIGS. 1A and 22.

Figure 24A:
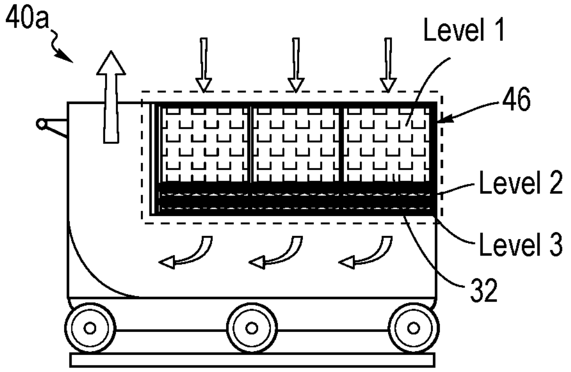
FIGS. 24A through 24H provide examples of alternative designs of a filter media element arranged in filter carts of the present disclosure.
Figure 24B:
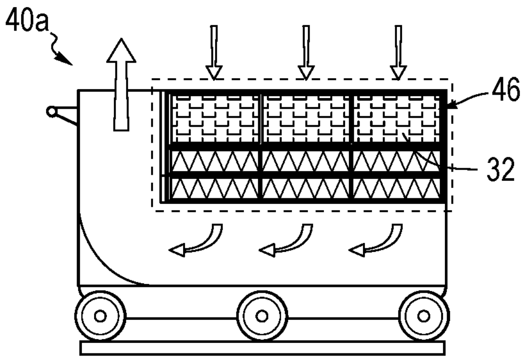
Figure 24C:
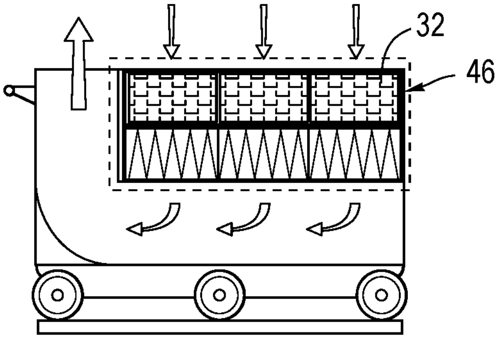
Figure 24D:
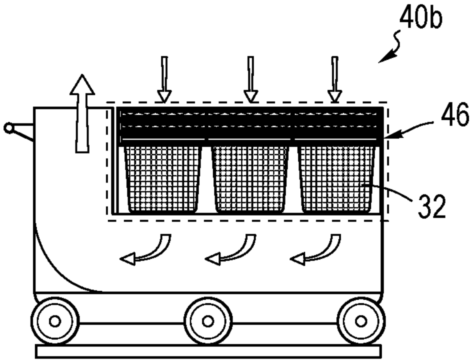
Figure 24E:
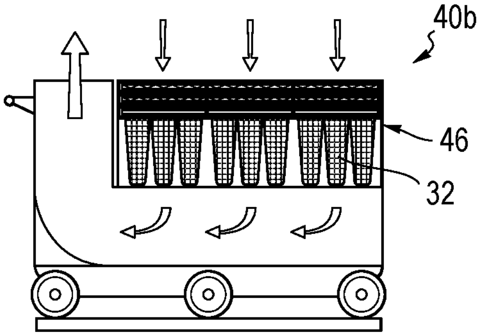

All painting operations are not equal. So, there are variations due to the type of paint used, the amount of over spray generated, the amount of airflow to be handled by the filters, and even a customer's preference for the type and brand of filters to use. For that reason, it is important that any filtration solution is able to adapt to each particular painting job demands. FIGS. 24A through 24E illustrate the flexibility of the present invention to adapt to different painting scenarios by presenting various options for the design of filter carts as described above, in terms of the filter rack (filter cage) design and the combination of filters used. The filter cart 40*a* in FIG. 24A uses a combination of cardboard and synthetic filter media elements for filtration levels 1, 2, and 3. The filter cart 40*a* of FIG. 24B is similar to the filter cart 40*a* of FIG. 24A having a variation in which filtration level 2 is a fiberglass filter. FIG. 24C shows another variation using two levels of filtration using a combination of cardboard and synthetic filters. FIG. 24D shows the filter cart 40*b* having filtration system using a tricube fine filter as its final level 3 after a fiberglass coarse and a synthetic mid filter. In filter cart 40*b* of FIG. 24E, bag type final filters are used as the final stage (level). As shown in FIGS. 24A through 24E, many combinations are possible for arranging the filter media elements 32 in the filter rack 46 in each filter cart as described above. The various arrangements of the filter media elements presented in FIGS. 24A through 24E are for illustration purposes only and do not restrict the flexibility inherent to the present invention. The presence of a customizable filter cage or rack inside the housing of the filter carts described above allows for the same cart design to be adapted to operate with all these different types of filters shown in FIGS. 24A through 24E.

Figure 24F:
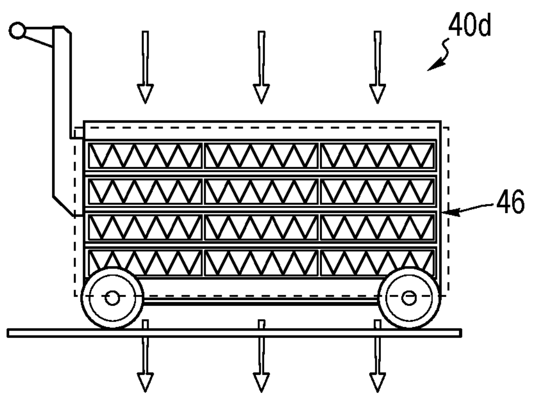
Figure 24G:
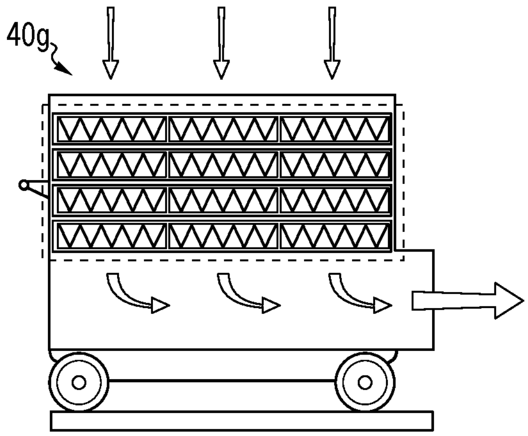
Figure 24H:
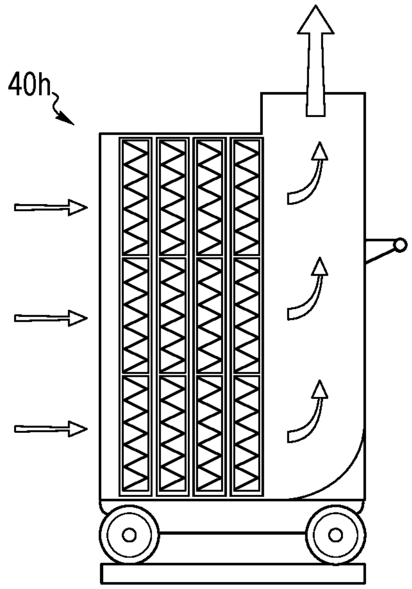

FIG. 24F shows the filter cart 40*d* having four levels of the filter rack 46, which includes a final HEPA filter. As shown in FIGS. 20 and 21, the filter cart 40*d* is generally used in the spray booth having the exhaust duct below the filter cart 40*d* such that the bottom surface of the filter cart 40*d* is connected to the exhaust duct. Filter cart 40*g* shown in FIG. 24G provides an exhaust duct which exits along a side surface of the filter cart 40*g* and presents a collection bin at the bottom of the cart adjacent to the exhaust duct. FIG. 24H presents a modified filter cart 40*h* having vertically arranged filter media elements. For example, the hood of the spray booth is connected to the side surface of the filter cart 40*h*. Also, the filter cart 40*h* having the vertically arranged filter media elements includes a collection bin at the bottom of the filter cart.

Figure 25A:
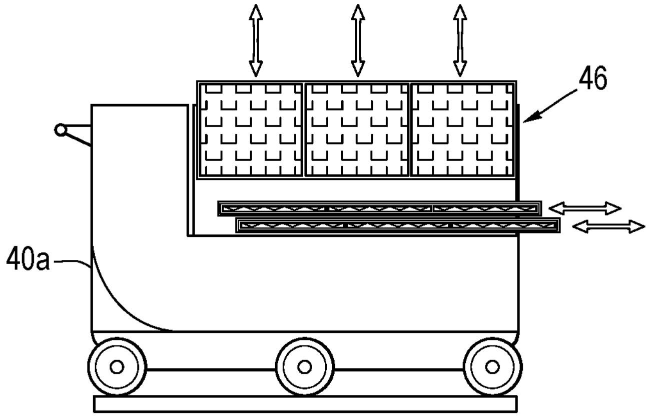
FIGS. 25A through 25C provide an exemplary design option of filter rack in the filter cart of FIG. 2.
Figure 25B:
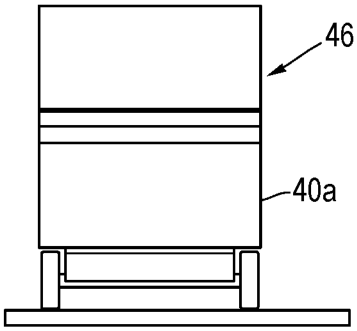
Figure 25C:
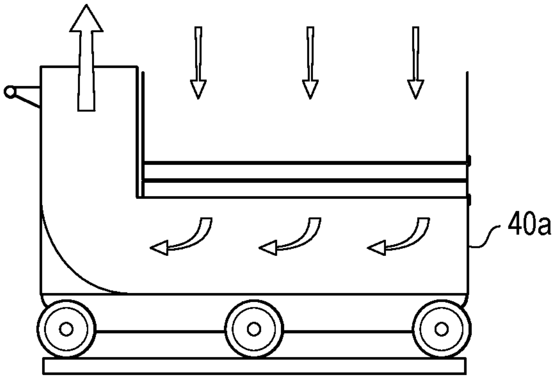
Figure 26A:
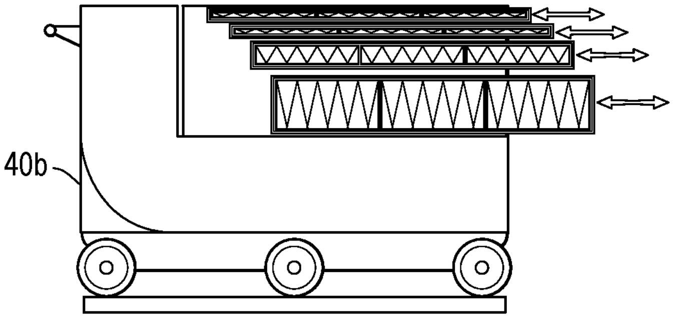
FIGS. 26A through 26C provide an exemplary design option of filter rack in the filter cart of FIG. 3.
Figure 26B:
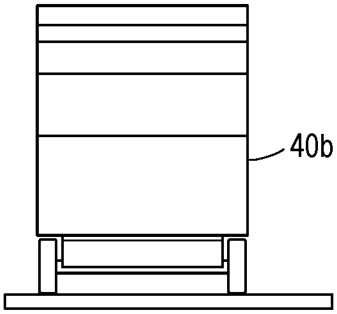
Figure 26C:
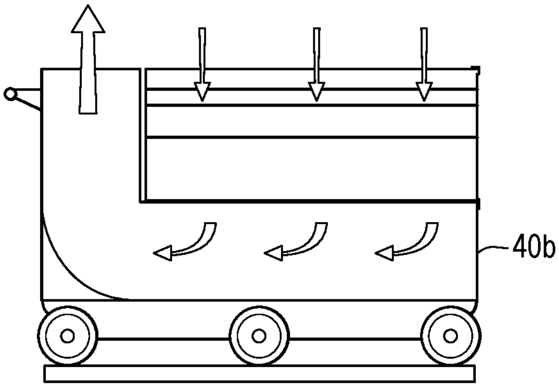

FIGS. 25A and 26A provide further illustrations of variations of the filter rack (filter cage) for the various filter carts described above. An advantage of the design of the present invention is that the filter cages are adaptable to the type of filters to be used and the most convenient way to replace filters. To the purpose of illustrating the flexibility inherent to the present invention, FIGS. 25A and 26A each presents two examples of possible designs of the filter cage and the corresponding filter replacement procedure. Depending on the design of the filter cage, the filter cart 40*a* of FIG. 25A shows a first stage filter media element loaded and unloaded in a vertical direction with the second and third levels of filtration provided by slide out elements moving horizontally. FIGS. 25B and 25C show in greater detail the design of the filter cart 40*a* and filter rack (filter cage) 46 by displaying the corresponding end view and side view of the cart 40*a* of FIG. 25A, without the filter media elements. FIG. 26A presents another variation of the filter cart 40*b* in which the design of the filter rack (filter cage) 46 allows for four levels of filtration in which all filters are replaced by sliding them out. Again, FIGS. 26B and 26C show in greater detail the design of the cart 40*b* and filter cage by displaying the corresponding end view and side view of the cart 40*b* of FIG. 26A, without the filters. It is understood that these drawings are for illustration purposes and that the filters may be slid out through the end of the cart as shown or through one side (not shown).

Figure 27A:
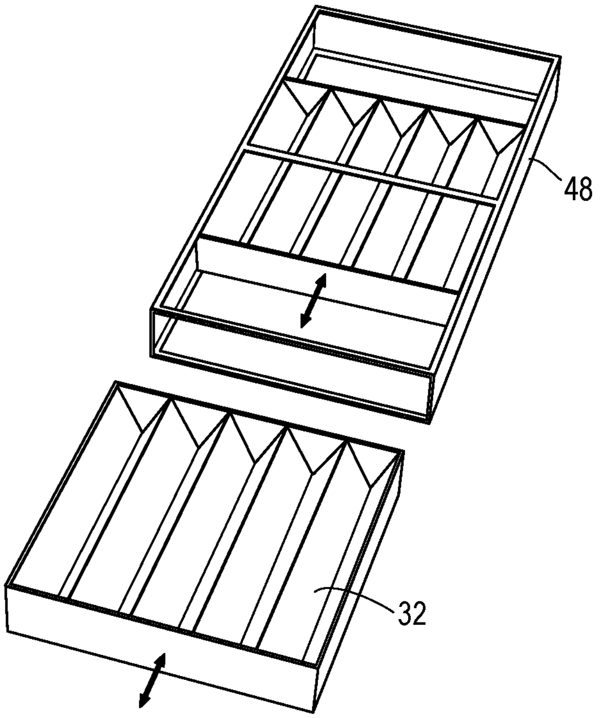
FIGS. 27A and 27B are pictorial views of filter frame options in a filter cart in accordance with the present disclosure.
Figure 27B:
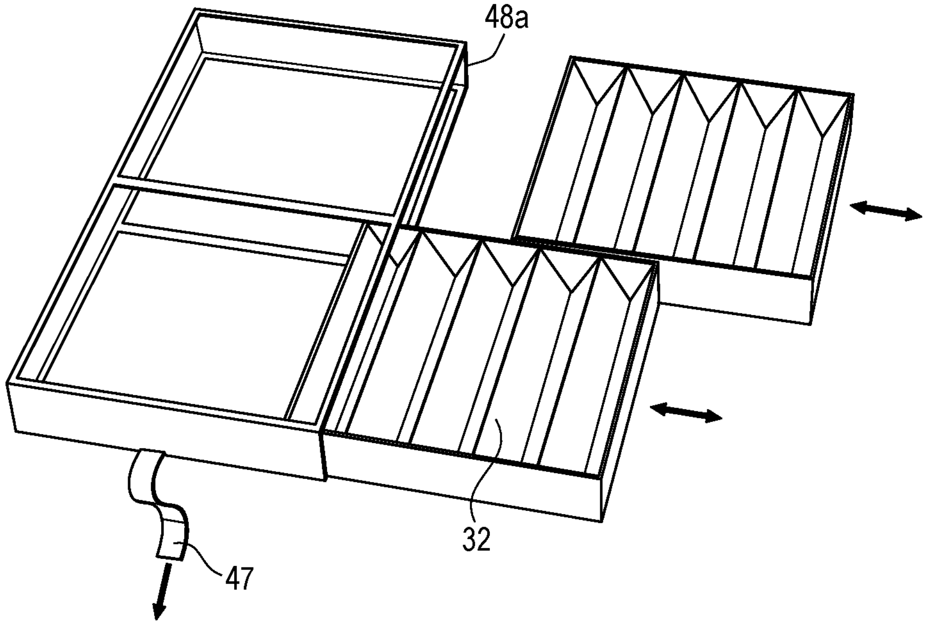

Commercial filters are commonly constructed with embedded frames. Materials used as embedded filter frames range from cardboard to metal. Typically, embedded filter frames are made to hold the filter shape but are not designed to withstand force. Taking into account that the paint captured by the filter during operation will dry and may glue the filter to the filter rack (filter cage), it may be difficult to remove the filters in one piece when replacement is needed. Leaving pieces of the filter attached to the cage would complicate refitting new filters and may impede achieving proper air seal. To avoid these problems, it is convenient to supplement the filters with sturdy metal or plastic frames (forming the filter rack or cage) tightly designed to tolerance. The shear that may break filters during removal is now handled by the sturdy frames. To ease the process, frames can be supplemented with pull straps 47. FIGS. 27A and 27B show various approaches toward loading filter media elements 32 into the frame 48 of the filter rack 46, depending on frame design. In FIG. 27A, the filter media element 32 is slid into the filter frame 48 along its width end, whereas in FIG. 27B, filter media elements 32 are loaded along the length side of the frame 48*a*. These filter frames 48 and 48*a* are then fitted into the filter cage 46 of the filter cart 40. Typically, the filters would be removed from the filter cage of the filter cart together with the sturdy filter frame 48 and 48*a* by pulling the strap 47. To reuse the sturdy frames 48 and 48*a*, the filter media elements 32 may be later removed from their corresponding sturdy frame and disposed, while the sturdy frame 48 and 48*a* can be subsequently cleaned and reused.

While the above description constitutes the preferred embodiment of the present invention, it will be appreciated that the invention is susceptible to modification, variation and change without departing from the proper scope and fair meaning of the accompanying claims.

What is claimed is:

1. A dry filter module adapted for use with a paint spray booth having an under section inlet for conducting a flow of contaminated air and an under section outlet for conducting a flow of filtered air, the dry filter module comprising:

at least one movable cart formed with a housing having one or more surfaces for providing a housing inlet and a housing outlet; and at least one filter media element arranged within the housing, the at least one filter media element positioned between the housing inlet and the housing outlet; and at least one seal provided around the one or more surfaces for sealing between the housing inlet and the under section inlet, and also between the housing outlet and the under section outlet, wherein the movable cart is operated to move for making contact with the at least one seal between the housing and the spray booth such that the housing of the at least one movable cart and the paint spray booth are connected and sealed to each other, and wherein the housing includes a top surface formed with the housing inlet for receiving the contaminated air from the paint spray booth and the housing outlet for discharging the filtered air such that the contaminated air from the paint spray booth generally vertically enters into the housing and the filtered air exits generally vertically from the housing.

2. The dry filter module of claim 1, wherein the dry filter module includes a collection bin arranged below the at least one filter media element such that the collection bin is configured to receive paint droplets captured by the at least one filter media element.

3. The dry filter module of claim 1, wherein the housing of the at least one movable cart further includes a hollow passage for communicating between the housing inlet and the housing outlet.

4. The dry filter module of claim 3, wherein the housing of the at least one movable cart includes a first chamber having a filter rack to receive the at least one filter media element and a second chamber having the hollow passage adjacent to the filter rack to exhaust airflow filtered from the filter rack of the housing.

5. The dry filter module of claim 4, wherein the filter rack of the housing is formed with at least one level receiving one filter media element such that the filter media element arranged in the at least one level is replaced with different types of the filter media element respectively.

6. The dry filter module of claim 5, wherein the filter media elements are each formed with a panel type filter or a bag type filter.

7. The dry filter module of claim 4, wherein the housing of the movable cart further includes a third chamber having at least one filter media element as a second filter rack.

8. The dry filter module of claim 7, wherein the first chamber having the filter rack and the third chamber having the second filter rack are communicated through the hollow passage formed in the second chamber of the housing.

9. The dry filter module of claim 7, wherein the second chamber is arranged below both the filter racks such that the filtered air passing through the first chamber vertically passes through the second filter rack toward an exhaust duct.

10. The dry filter module of claim 4, wherein the housing of the at least one movable cart further includes a pre-chamber formed with the housing inlet such that the first chamber having the filter rack is arranged between the pre-chamber and the second chamber.

11. The dry filter module of claim 10, wherein the filter rack formed in the first chamber receives the at least one filter media element vertically arranged in the filter rack.

12. The dry filter module of claim 10, wherein the dry filter module further includes a pre-filter arranged in the pre-chamber to collect accumulated paint forming droplets falling into a collection bin.

13. The dry filter module of claim 1, wherein the top surface of the housing is divided by a wall at a junction providing a separation between the housing inlet and the housing outlet.

14. The dry filter module of claim 1, wherein due to the housing outlet formed in the top surface of the housing, the filtered air flowing through the housing outlet avoids paint dropping from the filter media element.

15. The dry filter module of claim 1, wherein the at least one movable cart is positioned and locked over a lift in an under section below the paint spray booth defined as a loaded position.

16. The dry filter module of claim 15, wherein, in the loaded position of the at least one movable cart, the lift is operated to raise the at least one movable cart to seal between the housing inlet and the under section inlet and also between the housing outlet and the under section outlet defined as an operating position such that the at least one movable cart and the paint spray booth are sealed in the operating position.

17. The dry filter module of claim 1, wherein the dry filter module further includes an additional filter house structure arranged adjacent to the housing outlet of the movable cart such that the additional filter house structure is located between the housing outlet and an exhaust duct.

18. The dry filter module of claim 17, wherein the additional filter house structure is fixed on a surface of a sub-section below the paint spray booth.

19. The dry filter module of claim 17, wherein the additional filter house structure is formed with a separate filter cart positioned over a lift in a sub-section below the paint spray booth.

20. The dry filter module of claim 1, wherein each of the under section inlet and under section outlet formed in the paint spray booth includes a sliding door used to close both the under section inlet and outlet respectively such that each of the movable carts is replaced during the operation of the paint spray booth.

21. A dry filter module adapted for use with a paint spray booth having an under section inlet for communicating a flow of contaminated air and an under section outlet for conducting a flow of filtered air, the dry filter module comprising:

at least one movable cart formed with a housing having a generally horizontal surface forming a housing inlet, and the at least one movable cart further forming a housing outlet;

at least one filter media element arranged within the housing, the at least one filter media element positioned between the housing inlet and the housing outlet for filtering the contaminated air flowing through the at least one movable cart;

at least one seal provided on the generally horizontal surface for sealing between the housing inlet and the under section inlet, and also between the housing outlet and the under section outlet; and the dry filter module operable in two positions, a loaded position wherein the at least one movable cart is arranged in an under section before the sealing and an operating position wherein the dry filter module is in a sealing contact between the at least one movable cart and the paint spray booth, and wherein the housing includes a top surface selectively connected to the paint spray booth and formed with the housing inlet receiving the contaminated air from the paint spray booth, and a bottom surface selectively connected to an exhaust duct of the paint spray booth and formed with the housing outlet discharging the filtered air.

22. The dry filter module of claim 21, wherein the dry filter module further includes a lift operable to move the cart vertically between the loaded position and the operating position.

23. The dry filter module of claim 21, wherein the at least one seal includes an inflatable seal provided between the housing of the at least one movable cart and the paint spray booth.

* * * * *